US011334613B2

(12) United States Patent
Van Staden et al.

(10) Patent No.: US 11,334,613 B2
(45) Date of Patent: May 17, 2022

(54) GROUP PROFILE GENERATION AND CONTENT ITEM SELECTION BASED UPON GROUP PROFILES

(71) Applicant: Oath Inc., New York, NY (US)

(72) Inventors: Johannes Van Staden, Redwood City, CA (US); Narayana Babu Maddhuri, Fremont, CA (US); Wendell Craig Baker, Palo Alto, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 49 days.

(21) Appl. No.: 16/864,179

(22) Filed: May 1, 2020

(65) Prior Publication Data

US 2021/0342382 A1 Nov. 4, 2021

(51) Int. Cl.
| | |
|---|---|
| *G06F 16/9535* | (2019.01) |
| *G06F 16/435* | (2019.01) |
| *G06F 16/9538* | (2019.01) |
| *G06F 16/25* | (2019.01) |
| *H04L 29/06* | (2006.01) |

(52) U.S. Cl.
CPC .......... *G06F 16/437* (2019.01); *G06F 16/258* (2019.01); *G06F 16/9535* (2019.01); *G06F 16/9538* (2019.01); *H04L 63/104* (2013.01)

(58) Field of Classification Search
None
See application file for complete search history.

(56) References Cited

U.S. PATENT DOCUMENTS

| | | | |
|---|---|---|---|
| 2016/0253710 A1* | 9/2016 | Publicover | ......... H04N 21/4532 705/14.66 |
| 2018/0309801 A1* | 10/2018 | Rathod | ................. H04L 67/141 |
| 2021/0075885 A1* | 3/2021 | Hassan | ............. H04M 3/42051 |
| 2021/0090578 A1* | 3/2021 | Trapp | .................... H04W 76/15 |

* cited by examiner

*Primary Examiner* — Wilson Lee
(74) *Attorney, Agent, or Firm* — Cooper Legal Group LLC

(57) ABSTRACT

One or more computing devices, systems, and/or methods are provided. A first plurality of sets of device information associated with a plurality of devices may be received and/or identified. The plurality of devices may be grouped into a plurality of groups based upon the first plurality of sets of device information. A plurality of group profiles associated with the plurality of groups may be generated. A first group profile of the plurality of group profiles may be associated with a first group of the plurality of groups. The first group profile may be generated based upon sets of device information, of the first plurality of sets of device information, associated with the first group. A request for content associated with a first device belonging to the first group may be received. A first content item may be selected for presentation via the first device based upon the first group profile.

20 Claims, 15 Drawing Sheets

GROUP PROFILE GENERATION AND CONTENT ITEM SELECTION BASED UPON GROUP PROFILES

BACKGROUND

Many applications, such as websites, applications, etc. may provide platforms for viewing media. For example, a user may interact with a service, where the service may use user information associated with the user to determine interests of the user. For example, media may be selected for the user based upon the interests of the user.

SUMMARY

In accordance with the present disclosure, one or more computing devices and/or methods are provided. In an example, a first plurality of sets of device information associated with a plurality of devices may be received and/or identified. A set of device information of the first plurality of sets of device information may comprise identification information associated with a device of the plurality of devices and/or user information associated with the device of the plurality of devices. The plurality of devices may be grouped into a plurality of groups based upon the first plurality of sets of device information. A group of the plurality of groups may correspond to a set of devices of the plurality of devices. A plurality of group profiles associated with the plurality of groups may be generated. A first group profile of the plurality of group profiles may be associated with a first group of the plurality of groups. The first group profile may comprise group information associated with a first set of devices corresponding to the first group. The first group profile may be generated based upon a second plurality of sets of device information, of the first plurality of sets of device information, associated with the first set of devices corresponding to the first group. A request for content associated with a first device of the first set of devices may be received. A first content item may be selected for presentation via the first device based upon the first group profile.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
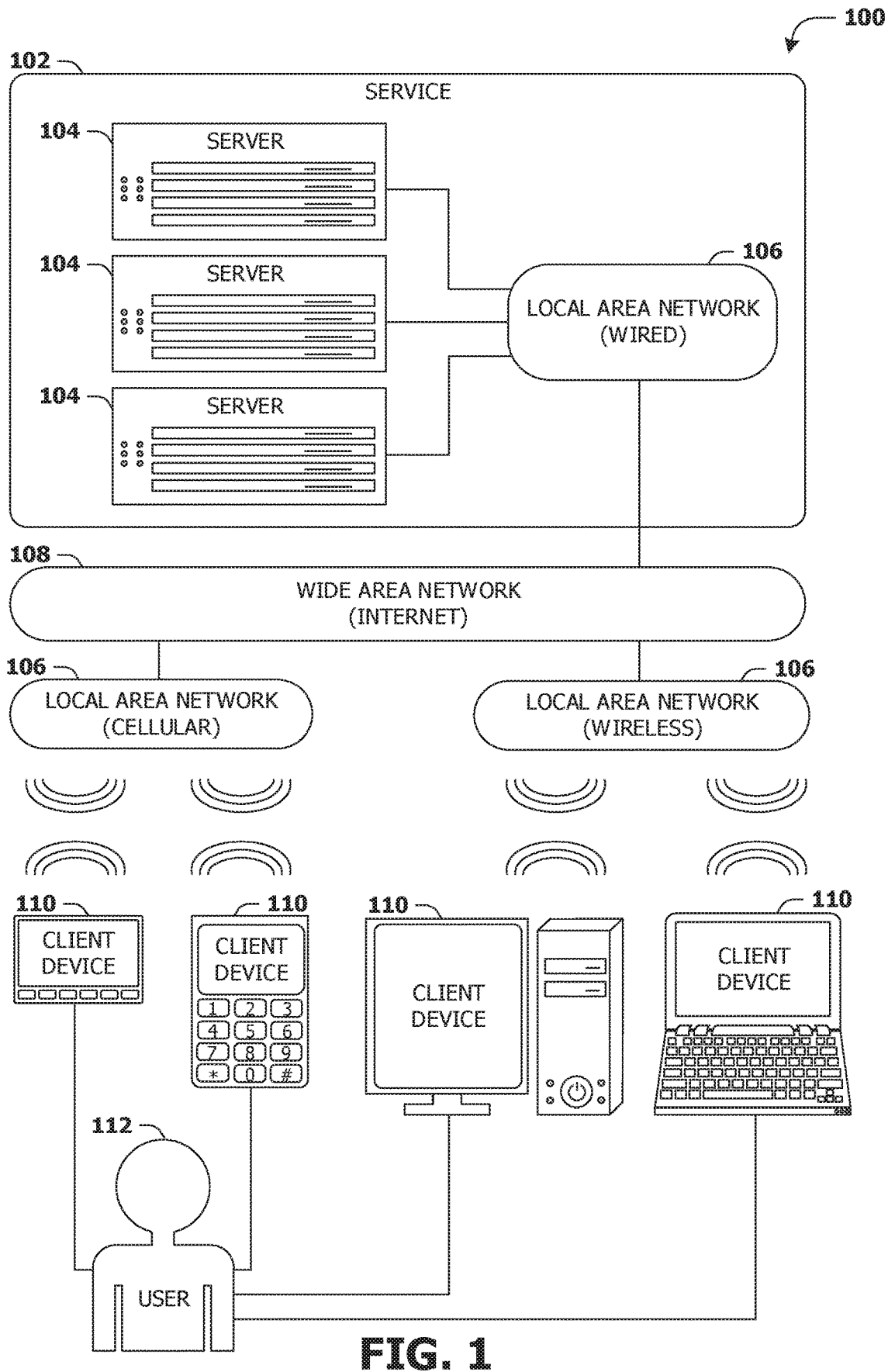
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
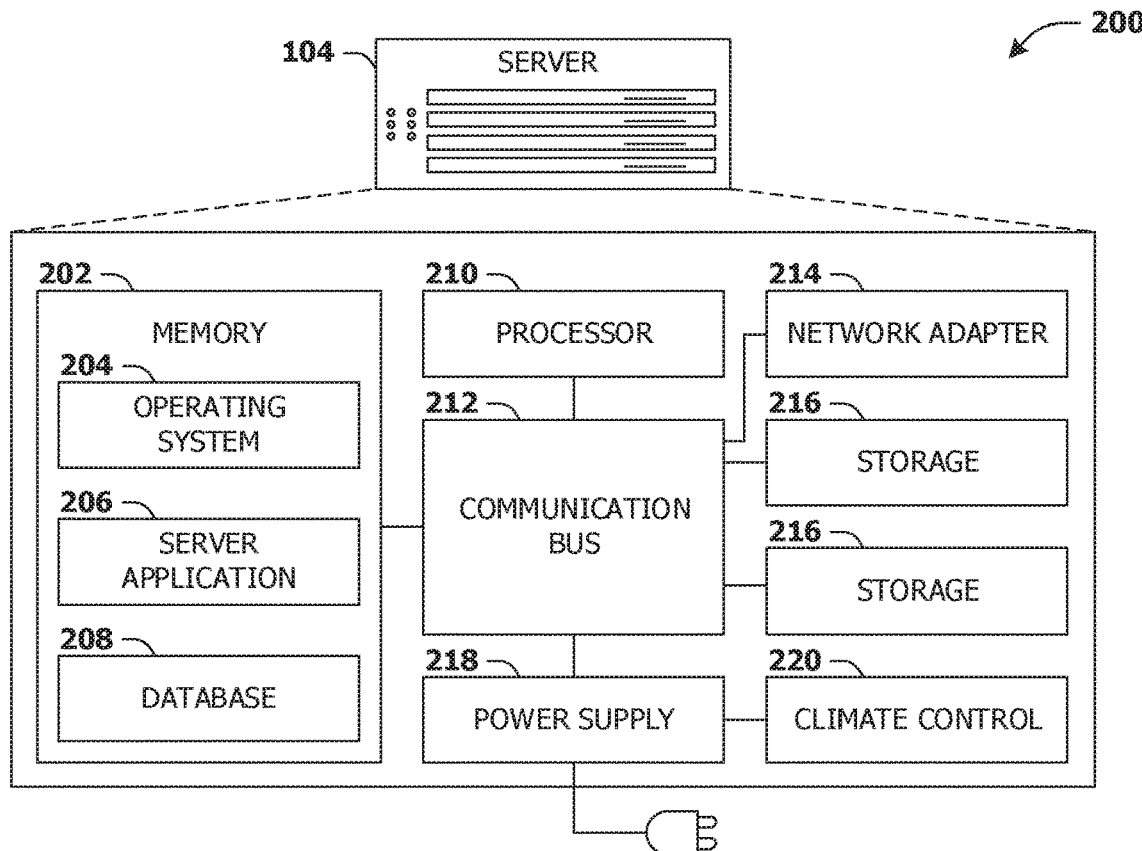
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
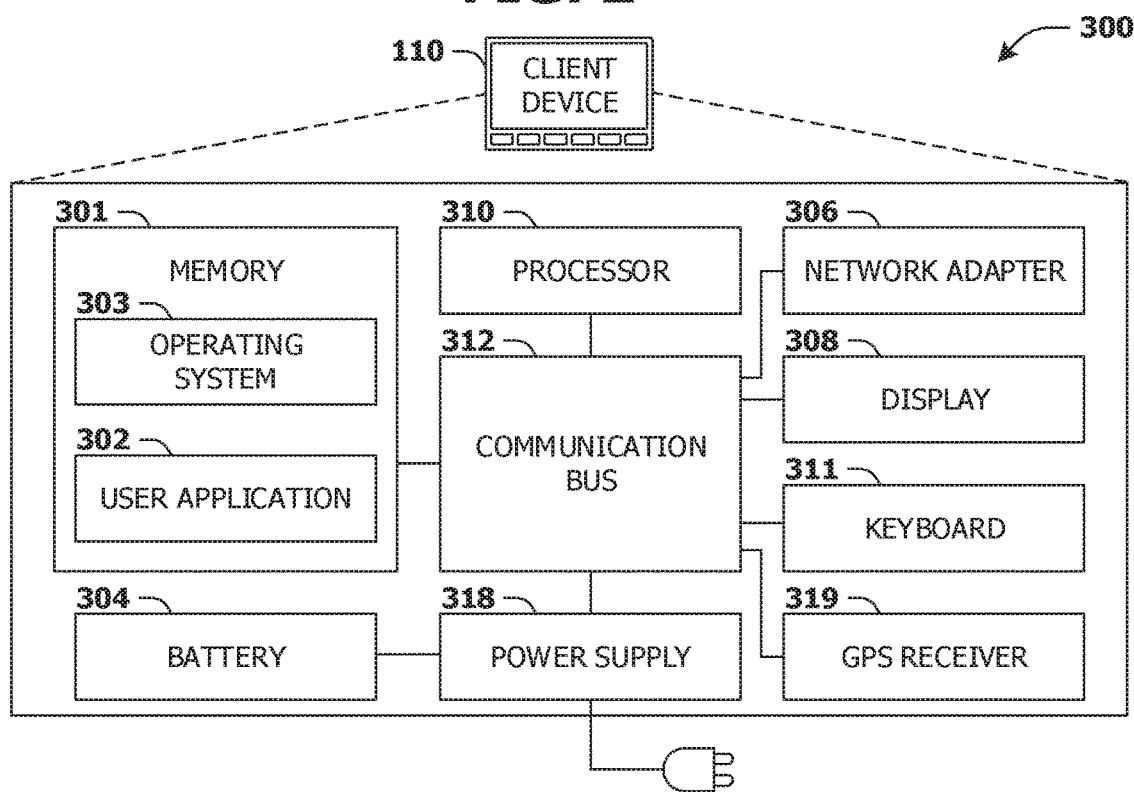
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating group profiles and/or selecting content for presentation via devices based upon group profiles are provided. For example, a user (and/or a device associated with the user) may access and/or interact with a service, such as a browser, software, a website, an application, an operating system, etc. that provides a platform for viewing and/or downloading content from a server associated with a content system. In some examples, the content system may use device information, such as one or more of identification information, activity information (e.g., search history information, website browsing history, email information, etc.), user demographic information, location information, etc. to determine interests of the user. For example, the device information may be received from the device (and/or one or more other devices associated with the user and/or a user account associated with the user). Alternatively and/or additionally, the device information may be received from servers associated with websites visited by the user, servers associated with an email account of the user, etc. In some examples, content, such as advertisements, may be selected for presentation via the device based upon the determined interests and/or the device information. However, the user may not be comfortable with such use of the device information for selection of content. For example, the user may consider the device information as private information and/or the user may believe that usage of the device information for selection of content and/or providing the device information to external systems violates the privacy of the user.

Thus, in accordance with one or more of the techniques presented herein, a first plurality of sets of device information associated with a plurality of devices may be identified. A set of device information of the first plurality of sets of device information may comprise identification information and/or user information associated with a device of the plurality of devices. The plurality of devices may be grouped into a plurality of groups based upon the first plurality of sets of device information. A group of the plurality of groups may comprise a set of devices of the plurality of sets of devices. A plurality of group profiles associated with the plurality of groups may be generated. In some examples, a first group profile may be associated with a first group of the plurality of groups. The first group profile may comprise first group information associated with a first set of devices corresponding to the first group. The first group profile may be generated based upon a second plurality of sets of device information, of the first plurality of sets of device information, associated with the first set of devices (e.g., a set of device information of the second plurality of sets of device information may be associated with a device of the first set of devices). In some examples, the first group information of the first group profile may correspond to one or more characteristics associated with the first set of devices, such as one or more demographic characteristics and/or one or more activity characteristics. In some examples, a request for content associated with a first device of the first set of devices may be received. A first content item may be selected for presentation via the first device based upon the first group profile.

Figure 4:
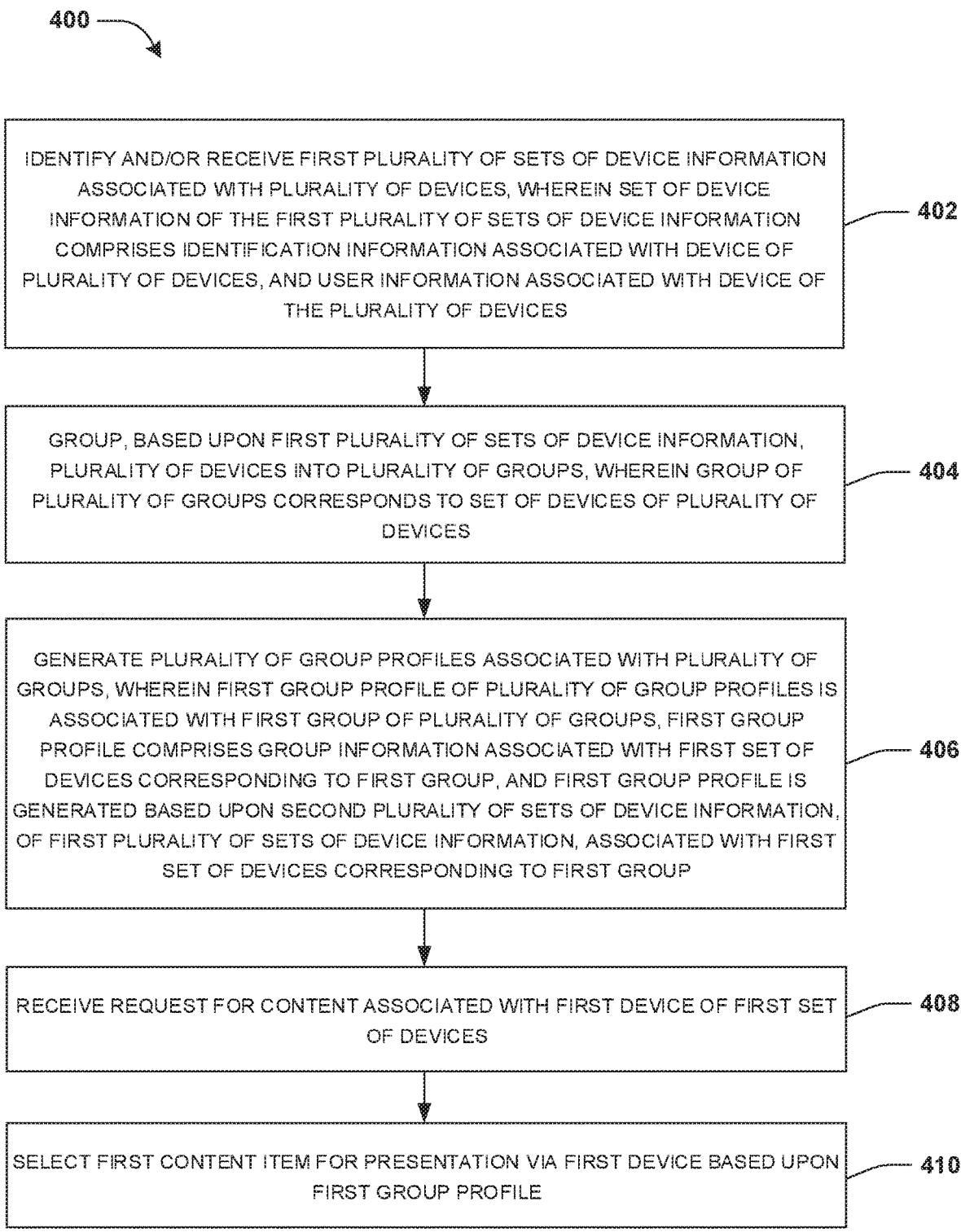
FIG. 4 is a flow chart illustrating an example method for generating group profiles and/or selecting content for presentation via devices based upon group profiles.

An embodiment of generating group profiles and/or selecting content for presentation via devices based upon group profiles is illustrated by an example method 400 of FIG. 4. A content system for presenting content via devices may be provided. In some examples, the content system may be an advertisement system (e.g., an online advertising system). Alternatively and/or additionally, the content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

At 402, a first plurality of sets of device information associated with a first plurality of devices may be received and/or identified. In some examples, a set of device information of the first plurality of sets of device information (and/or each set of device information of the first plurality of sets of device information) comprises identification information (e.g., device identification information and/or user identification information) associated with a device of the first plurality of devices and/or user information (e.g., activity information, demographic information and/or location information) associated with the device.

For example, a first set of device information of the first plurality of sets of device information may be associated with a first device of the first plurality of devices. In some examples, the first set of device information comprises first identification information associated with a first device and/or first user information associated with the first device.

In some examples, the first identification information comprises first device identification information associated with the first device, such as at least one of a device identifier of the first device, an IP address associated with the first device, a client identifier of the first device, etc. In some examples, the first identification information comprises first user identification information associated with a first user of the first device. The first user identification information may comprise an indication of a first user account associated with the first user and/or the content system. For example, the first user identification information may comprise at least one of a user account identifier, a username, etc. associated with the first user account.

In some examples, the first user information comprises first activity information (e.g., search history information, website browsing history, email information, etc.) associated with the first user and/or the first device. For example, the first activity information may be indicative of at least one of one or more consumed internet resources (e.g., a consumed internet resource may correspond to at least one of a content item, an article, a video, an audio file, an image, a web page, an advertisement, an email, a message, etc. consumed by the first user), one or more accessed internet resources, one or more selected internet resources, one or more content item interactions (e.g., an advertisement impression, an advertisement click, etc.), one or more queries used for performing searches (e.g., searches performed using a search engine), one or more games interacted with via the first device, etc.

In some examples, at least a portion of the first activity information may be determined based upon one or more sets of data (e.g., one or more tuples and/or one or more bundles) received from the first device. For example, the one or more sets of data may be indicative of at least one of a request to access an internet resource, a selection of an internet resource, an interaction with a content item, an interaction with a game, etc. A set of data (e.g., a tuple and/or a bundle) of the one or more sets of data may comprise identification information (e.g., at least one of an IP address, a device identifier, a client identifier, an indication of the first user account, etc.) and/or an activity indication (e.g., at least one of an indication of an internet resource being accessed using the first device, an indication of a status of a game that is being played using the first device and/or the first user account, etc.). Alternatively and/or additionally, at least a portion of the first activity information may be determined based upon one or more sets of data received from a server with which the first device may communicate. For example, the first device may communicate with the server to access and/or interact with at least one of an internet resource, a content item, a game, etc. The one or more sets of data received from the server may be indicative of at least one of one or more internet resources the first device accessed and/or interacted with, one or more games the first device accessed and/or interacted with, etc.

In some examples, the first user information comprises first demographic information associated with the first user of the first device. In some examples, the first demographic information comprises a first age (and/or a first age range) of the first user, a first family size associated with the first user, a first gender of the first user, a first occupation of the first user, a first income of the first user, a first education level of the first user and/or a different demographic parameter associated with the first user. In some examples, the first demographic information may be determined based upon at least a portion of the first activity information, such as based upon one or more sets of data received from the first device and/or from one or more other sources. For example, the first age of the first user may be determined based upon the first activity information (e.g., it may be determined that the first age of the first user corresponds to pre-retirement age based upon an identification of one or more internet resources accessed by the first device which provide information related to retiring). Alternatively and/or additionally, the first occupation of the first user may be determined based upon the first activity information (e.g., it may be determined that the first occupation of the first user corresponds to engineering based upon an identification of one or more internet resources accessed by the first device which provide information related to engineering).

At 404, the first plurality of devices may be grouped into a plurality of groups based upon the first plurality of sets of device information. In some examples, a group of the plurality of groups corresponds to a set of devices of the first plurality of devices. In some examples, the first plurality of devices may be grouped into the plurality of groups based upon similarities between characteristics (e.g., at least one of activity characteristics, demographic characteristics, etc.) associated with devices of the first plurality of devices.

In some examples, the first plurality of devices may be grouped into the plurality of groups by grouping a first set of devices of the first plurality of devices into a first group of the plurality of groups, grouping a second set of devices of the first plurality of devices into a second group of the plurality of groups, grouping a third set of devices of the first plurality of devices into a third group of the plurality of groups, etc.

In some examples, the first device is grouped into the first group (e.g., the first device is included in the first set of devices corresponding to the first group). In some examples, the first device is grouped into the first group based upon a determination that one or more first characteristics associated with the first device match and/or are similar to one or more second characteristics associated with one or more devices of the first group.

For example, the one or more first characteristics and/or the one or more second characteristics may comprise one or more demographic parameters. In an example, the first age (and/or the first age range) indicated by the first set of device information associated with the first device may match and/or be similar to one or more ages (and/or one or more ages) indicated by one or more sets of device information associated with one or more devices of the first group (e.g., the first age may be determined to match and/or be similar to a second age of the one or more ages if the first age is equal to and/or within a threshold difference of the second age). Alternatively and/or additionally, the first family size indicated by the first set of device information associated with the first device may match and/or be similar to one or more family sizes indicated by one or more sets of device information associated with one or more devices of the first group. Alternatively and/or additionally, the first occupation indicated by the first set of device information associated with the first device may match and/or be similar to one or more occupations indicated by one or more sets of device information associated with one or more devices of the first group.

Alternatively and/or additionally, the one or more first characteristics and/or the one or more second characteristics may comprise one or more actions associated with user activity. In an example, the first set of device information associated with the first device and one or more sets of device information associated with the one or more devices of the first group may be indicative of one or more same internet resources (e.g., the first set of device information associated with the first device and one or more sets of device information associated with the one or more devices of the first group may be indicative of the one or more same internet resources being consumed, accessed and/or selected). Alternatively and/or additionally, the first set of device information associated with the first device and one or more sets of device information associated with the one or more devices of the first group may be indicative of one or more interactions with one or more same content items. Alternatively and/or additionally, the first set of device information associated with the first device and one or more sets of device information associated with the one or more devices of the first group may be indicative of one or more same queries used for performing searches.

At 406, a plurality of group profiles associated with the plurality of groups may be generated. In some examples, a group profile of the plurality of group profiles (and/or each group profile of the plurality of group profiles) may be associated with a group of the plurality of groups. For example, a first group profile of the plurality of group profiles may be associated with the first group of the plurality of groups, a second group profile of the plurality of group profiles may be associated with the second group of the plurality of groups, etc.

In some examples, the plurality of group profiles may be generated based upon the first plurality of sets of device information. For example, the first group profile associated with the first group may be generated based upon a second plurality of sets of device information, of the first plurality of sets of device information, associated with the first set of devices corresponding to the first group. The first group profile may be indicative of first group information associated with the first set of devices.

In some examples, the first group information may be indicative of one or more group characteristics (e.g., at least one of activity characteristics and/or demographic characteristics) associated with the first set of devices. Alternatively and/or additionally, the first group information may be indicative of a prevalence of a characteristic of the one or more group characteristics amongst the first set of devices. For example, the first group information may be indicative of a proportion of devices, of the first set of devices, associated with a characteristic of the one or more group characteristics.

In some examples, the one or more group characteristics of the first group information may comprise a first characteristic corresponding to an internet resource that is consumed, accessed and/or selected by one or more devices of the first set of devices. The first group information may be indicative of a proportion of devices, of the first set of devices, that consumed, accessed and/or selected the internet resource. Alternatively and/or additionally, the first group information may be indicative of a quantity of devices, of the first set of devices, that consumed, accessed and/or selected the internet resource. Alternatively and/or additionally, the first group information may be indicative of a probability that a device, of the first set of devices, is a device that consumed, accessed and/or selected the internet resource.

In some examples, the one or more group characteristics of the first group information may comprise a second characteristic corresponding to a first topic associated with internet resources that are consumed, accessed and/or selected by one or more devices of the first set of devices. The first group information may be indicative of a proportion of devices, of the first set of devices, that consumed, accessed and/or selected internet resources associated with the first topic. Alternatively and/or additionally, the first group information may be indicative of a quantity of devices, of the first set of devices, that consumed, accessed and/or selected internet resources associated with the first topic. Alternatively and/or additionally, the first group information may be indicative of a probability that a device, of the first set of devices, is a device that consumed, accessed and/or selected internet resources associated with the first topic.

In an example, the first topic may correspond to one or more topics associated with subject matter of one or more internet resources consumed by one or more device of the first set of devices. For example, the first topic may correspond to at least one of sports (e.g., internet resources associated with sports may be sports articles, sports movies, etc.), politics (e.g., internet resources associated with politics may be news articles related to politics, analyses of political events, etc.), cuisine, economy, technology, music, a certain type of music, etc. Alternatively and/or additionally, the first topic may correspond to one or more entities, such as at least one of places (e.g., countries, cities, geographic locations, etc.), people (e.g., people of a particular location, people with a particular occupation, politicians, celebrities, socialites, etc.), things (e.g., devices, natural objects, etc.), organizations, ideas, systems, events, historical events, current events, abstract objects, physical objects, etc. Alternatively and/or additionally, the first topic may correspond to one or more products and/or services, such as at least one of shoes, cars, electronics, phones, landscaping, catering, etc.

In some examples, the one or more group characteristics of the first group information may comprise a third characteristic corresponding to a first demographic parameter associated with one or more devices of the first set of devices. For example, the one or more devices of the first set of devices may be associated with users corresponding to the first demographic parameter. The first group information may be indicative of a proportion of devices, of the first set of devices, that are associated with the first demographic parameter. Alternatively and/or additionally, the first group information may be indicative of a quantity of devices, of the first set of devices, that are associated with the first demographic parameter. Alternatively and/or additionally, the first group information may be indicative of a probability that a device, of the first set of devices, is a device that is associated with the demographic parameter.

In an example, the first demographic parameter may correspond to one or more demographic parameters associated with one or more devices of the first set of devices. For example, the first demographic parameter may correspond to at least one of an age (and/or an age range) of users associated with devices of the first set of devices, a family size of users associated with devices of the first set of devices, an occupation of users associated with devices of the first set of devices, etc.

Figure 5A:
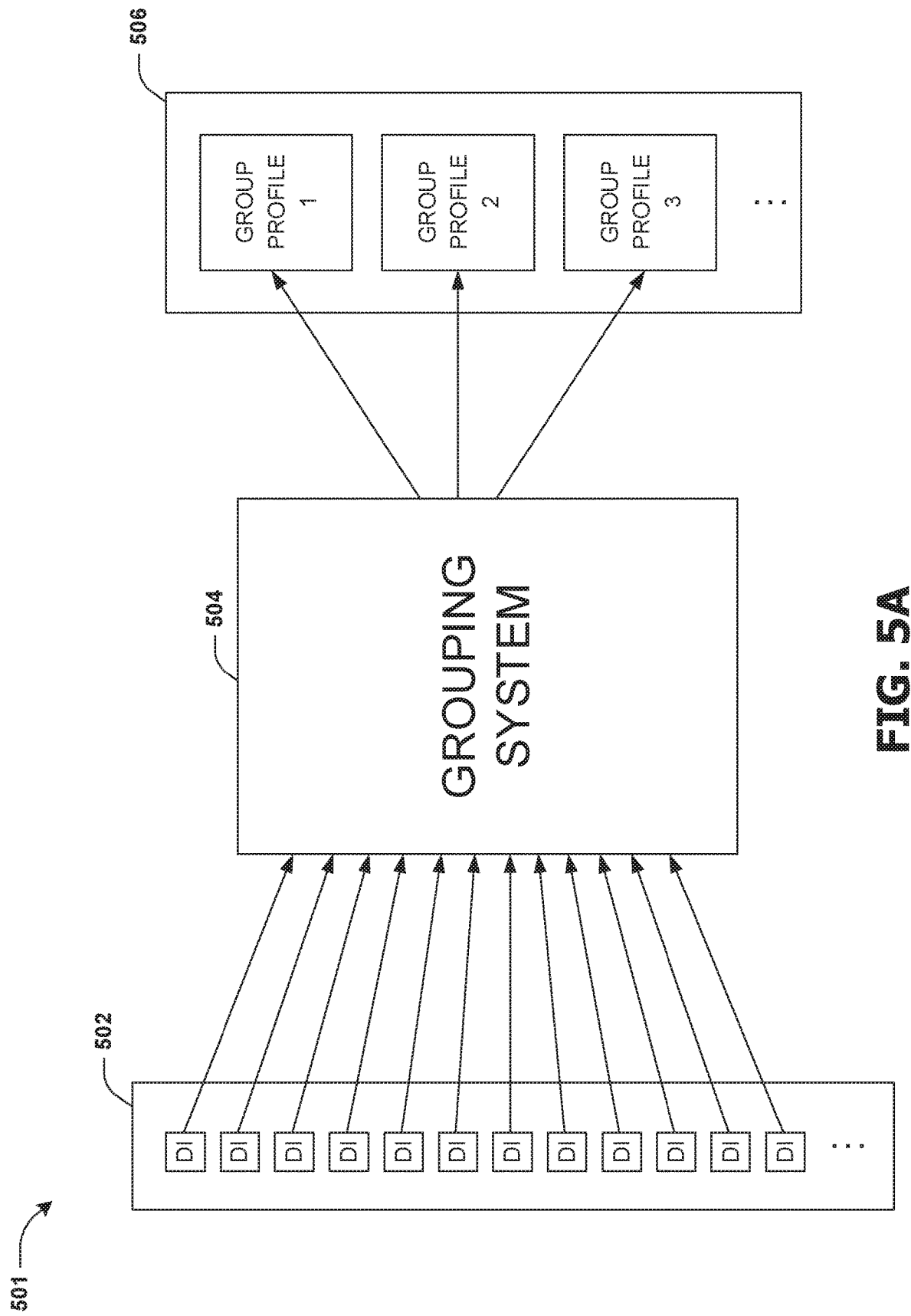
FIG. 5A is a diagram illustrating an exemplary system for generating group profiles and/or selecting content for presentation via devices based upon group profiles, where a plurality of group profiles is generated based upon a first plurality of sets of device information.

FIGS. 5A-5K illustrate examples of a system 501 for generating group profiles and/or selecting content for presentation via devices based upon group profiles, described with respect to the example method 400 of FIG. 4. FIG. 5A illustrates the plurality of group profiles (shown with reference number 506) being generated based upon the first plurality of sets of device information (shown with reference number 502). In some examples, a grouping system 504 may group the first plurality of devices into the plurality of groups based upon the first plurality of sets of device information 502. The grouping system may generate the plurality of group profiles 506 associated with the plurality of groups based upon the first plurality of sets of device information 502.

Figure 5B:
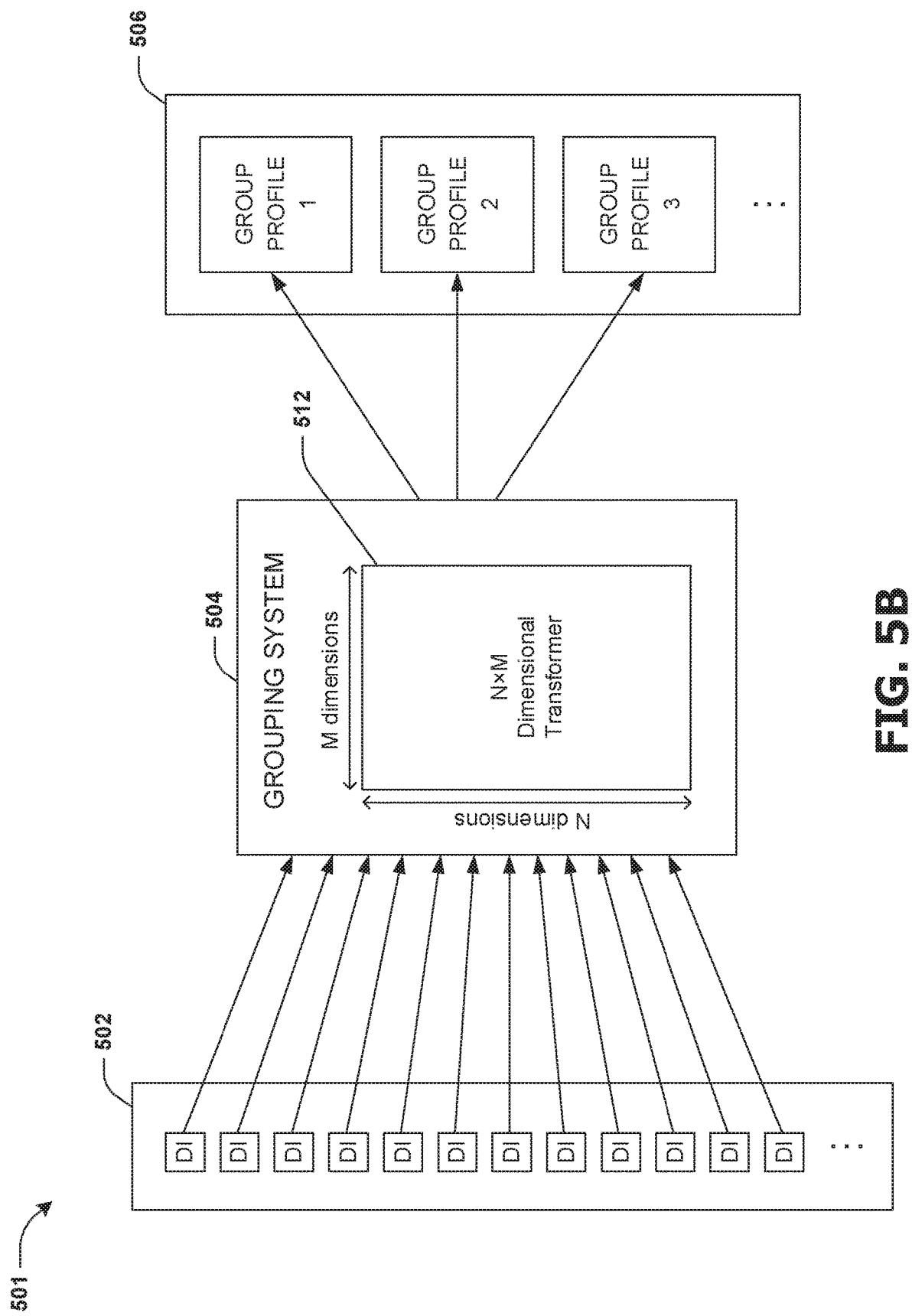
FIG. 5B is a diagram illustrating an exemplary system for generating group profiles and/or selecting content for presentation via devices based upon group profiles, where an exemplary embodiment of a grouping system generates a plurality of group profiles.

FIG. 5B illustrates an exemplary embodiment of the grouping system 504 generating the plurality of group profiles 506. In some examples, the grouping system 504 may comprise a dimensional transformer 512, such as a dimensional reduction system. In some examples, the grouping system 504 may use one or more decomposition techniques and/or one or more reconstruction techniques to perform dimensional reduction of the first plurality of sets of device information 502 to generate the plurality of group profiles 506. For example, the one or more decomposition techniques and/or the one or more reconstruction techniques may comprise usage of an algorithm (e.g., a Frequent Directions algorithm, a heavy hitters algorithm, a frequent items algorithm and/or a different algorithm associated with matrix sketching) to generate (and/or distinguish) different segments (e.g., vector representations) defining the plurality of groups and/or the plurality of group profiles 506. In an example, the one or more decomposition techniques and/or the one or more reconstruction techniques may comprise performing Singular Value Decomposition (SVD) on the first plurality of sets of device information 502 to generate (and/or distinguish) the different segments defining the plurality of groups and/or the plurality of group profiles 506. In some examples, the dimensional transformer 512 may be associated with M dimensions of segments (e.g., M dimensions of synthetic segments), shown as "M dimensions" in FIG. 5B and/or N dimensions of device facts, shown as "N dimensions" in FIG. 5B. In some examples, a device fact associated with the N dimensions of device facts may correspond to a set of data of a set of device information of the first plurality of sets of device information 502, such as at least one of a demographic parameter associated with a device, an internet resource accessed by a device, etc. In some examples, the quantity M of the M dimensions is less than the quantity N of the N dimensions. In some examples, the grouping system 504 performs the one or more decomposition techniques and/or the one or more reconstruction techniques on a first M×N matrix corresponding to the first plurality of sets of device information 502 to generate (and/or distinguish) the different segments defining the plurality of groups and/or the plurality of group profiles 506. In some examples, the one or more decomposition techniques and/or the one or more reconstruction techniques may enable streaming data to be used for generating, updating and/or modifying the plurality of group profiles 506. For example, sets of data (e.g., tuples and/or bundles) received from devices of the first plurality of devices (and/or from other sources) may be input to the grouping system 504 individually (and/or in combination) to generate, update and/or modify the plurality of group profiles 506 as the sets of data are received and/or input to the grouping system 504.

In some examples, the first set of device information associated with the first device may comprise a first representation (e.g., a vector representation, such as a vector of Booleans) having N dimensions. For example, for each dimension of the N dimensions, the first representation may be indicative of whether a device fact (e.g., a demographic parameter such as an age and/or an activity such as a selection of an internet resource) associated with the dimension is true for the first device (and/or the first user). In an example, a dimension of the N dimensions may correspond to an age range, and the first representation may be indicative of whether the first age of the first user matches the age range.

Similar to the first set of device information comprising the first representation having N dimensions, other sets of device information of the second plurality of sets of device information associated with the first group may also comprise representations having N dimensions. For example, each set of device information of the second plurality of sets of device information may comprise a representation having N dimensions (and/or a different quantity of dimensions) associated with N device facts (and/or a different quantity of device facts), where the representation may be indicative of whether a device fact of the N device facts is true. The first group profile may comprise a second representation having M dimensions associated with M group facts. Multiple device facts, associated with multiple dimensions of the N dimensions associated with the first group, may be combined and/or mixed together to form one or more group facts of the M group facts, such as by performing dimensional reduction of the second plurality of sets of device information to generate the first group profile. The quantity M of the M dimensions may be less than the quantity N of the N dimensions (as a result of performing the dimensional reduction of the second plurality of sets of device information to generate the first group profile). In some examples, for a dimension of the M dimensions, the second representation may be indicative of whether a group fact (e.g., a demographic parameter such as an age and/or an activity such as a selection of an internet resource) associated with the dimension is true for the first group. Alternatively and/or additionally, for a dimension of the M dimensions, the second representation may be indicative of a probability that a group fact associated with the dimension is true for a device of the first set of devices corresponding to the first group. Alternatively and/or additionally, for a dimension of the M dimensions, the second representation may be indicative of a proportion of devices of the first set of devices for which a group fact associated with the dimension is true. In an example, a dimension of the M dimensions may correspond to an age range, and the second representation may be indicative of a proportion of devices, of the first set of devices, associated with users that match the age range. In another example, a dimension of the M dimensions may correspond to a gender, and the second representation may be indicative of a proportion of devices, of the first set of devices, associated with users that are associated with the gender. In another example, a dimension of the M dimensions may correspond to activity associated with a topic, and the second representation may be indicative of a proportion of devices, of the first set of devices, that performed activity associated with the topic. Thus, the first group profile may not comprise user identifiable information that directly identifies activity, demographics, etc. of individual users associated with the first group. Rather, the first group profile may comprise an estimation of characteristics of the first group as a whole.

In some examples, the first plurality of devices may be grouped into the plurality of groups and/or the plurality of group profiles may be generated based upon one or more privacy regulations associated with the first plurality of devices. For example, usage and/or transmission of device information associated with the first plurality of devices may be governed and/or regulated by the one or more privacy regulations (e.g., the one or more privacy regulations may apply to the first plurality of devices). Alternatively and/or additionally, the one or more privacy regulations may define one or more privacy requirements associated with usage and/or transmission of device information of the first plurality of devices. In some examples, a scope of a group profile of the plurality of group profiles and/or a specificity with which the group profile defines characteristics of a device belonging to a corresponding group may be controlled based upon the one or more privacy requirements and/or the one or more privacy regulations. In an example with respect to FIG. 5B, an error term associated with performing the dimensional reduction of the first plurality of sets of device information 502 to generate the plurality of group profiles 506 may be controlled based upon the one or more privacy requirements and/or the one or more privacy regulations.

In some examples, a plurality of sets of group profile information associated with the plurality of group profiles may be stored in a first plurality of user profiles associated with the first plurality of devices. Alternatively and/or additionally, the first plurality of user profiles associated with the first plurality of devices may be generated based upon the first plurality of sets of group profile information. In some examples, each user profile of the first plurality of user profiles may comprise a set of group profile information of the plurality of sets of group profile information. In some examples, the first plurality of user profiles may be stored in a user profile database.

In some examples, a first set of group profile information of the plurality of sets of group profile information may be associated with the first group profile. In some examples, the first set of group profile information may be stored in a first set of user profiles, of the first plurality of user profiles, associated with the first set of devices corresponding to the first group. Alternatively and/or additionally, the first set of user profiles may be generated based upon the first set of group profile information (e.g., a user profile of the first set of user profiles may be generated such that the user profile comprises the first set of group profile information).

Alternatively and/or additionally, a second set of group profile information of the plurality of sets of group profile information may be associated with the second group profile. In some examples, the second set of group profile information may be stored in a second set of user profiles, of the first plurality of user profiles, associated with the second set of devices corresponding to the second group. Alternatively and/or additionally, the second set of user profiles may be generated based upon the second set of group profile information (e.g., a user profile of the second set of user profiles may be generated such that the user profile comprises the second set of group profile information).

In some examples, each set of group profile information of the plurality of sets of group profile information comprises a group profile of the plurality of group profiles. Accordingly, each user profile of the first plurality of user profiles may comprise a group profile of the plurality of group profiles. In an example, the first set of group profile information may comprise the first group profile. Accordingly, the first group profile may be comprised within each user profile of the first set of user profiles associated with the first group.

Alternatively and/or additionally, each set of group profile information of the plurality of sets of group profile information comprises merely an indication of a group profile of the plurality of group profiles. Accordingly, each user profile of the first plurality of user profiles may comprise an indication of a group profile of the plurality of group profiles. In an example, the first set of group profile information may comprise a first indication of the first group profile. Accordingly, rather than each user profile of the first set of user profiles comprising the first group profile, each user profile of the first set of user profiles may comprise the first indication of the first group profile. In some examples, the first indication of the first group profile may comprise at least one of an identifier, a pointer, a reference, a link, etc. indicating a location and/or an address of the first group profile in a memory unit within which the first group profile is stored. For example, the first indication of the first group profile may be used to access the first group profile.

In some examples, a user profile of the first plurality of user profiles (and/or each user profile of the first plurality of user profiles) may comprise identification information (e.g., device identification information and/or user identification information) associated with a device associated with the user profile, user information (e.g., activity information, demographic information and/or location information) associated with the device and/or a set of group information (e.g., a group profile and/or an indication of a group profile) corresponding to a group to which the device belongs.

In an example, a first user profile of the first plurality of user profiles may correspond to the first device. The first user profile may comprise the first identification information associated with the first device. Alternatively and/or additionally, the first user profile may comprise the first user information associated with the first device. Alternatively and/or additionally, the first user profile may comprise the first set of group information (e.g., the first group profile and/or the first indication of the first group profile) based upon the first device belonging to the first group.

Figure 5C:
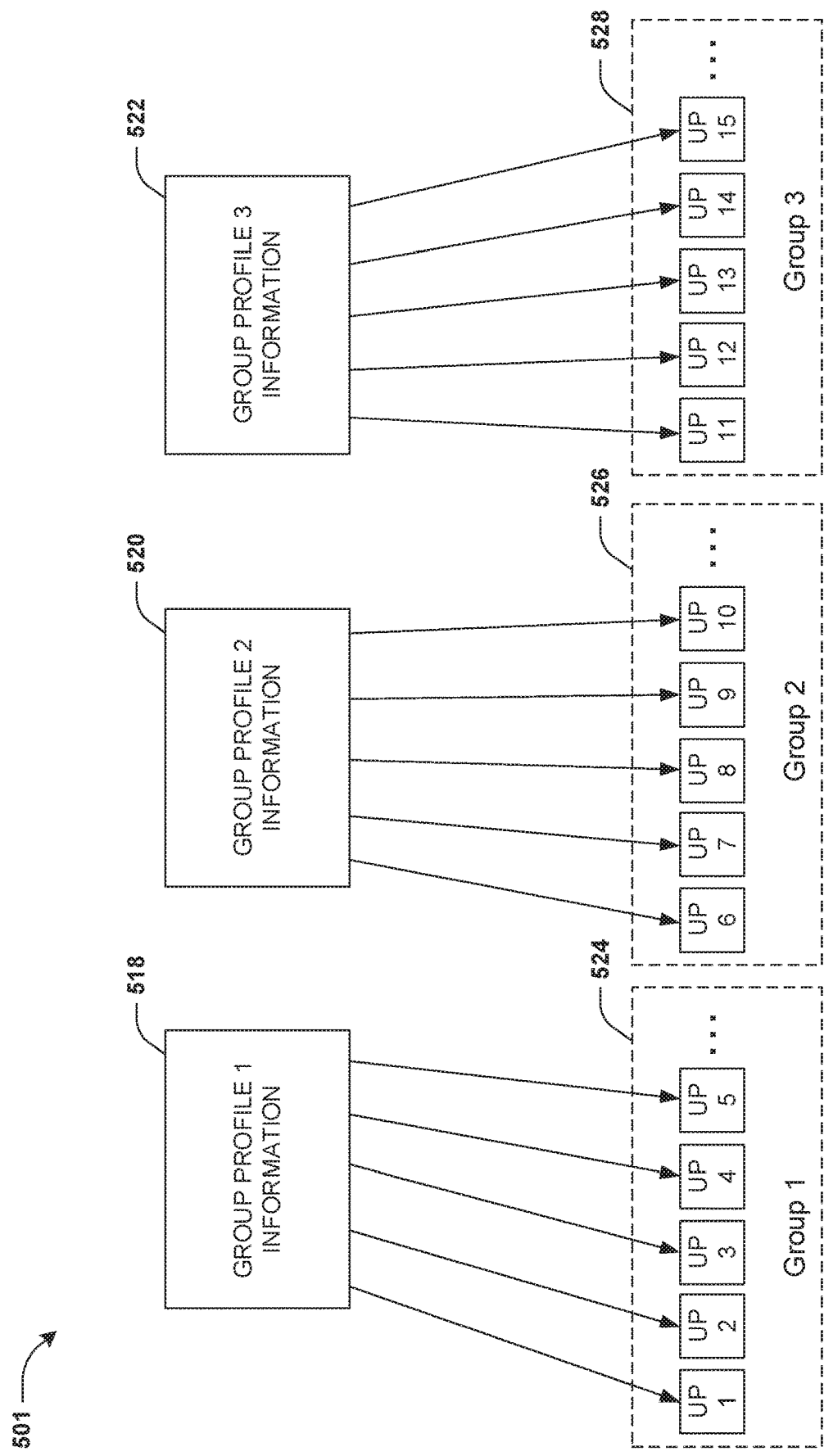
FIG. 5C is a diagram illustrating an exemplary system for generating group profiles and/or selecting content for presentation via devices based upon group profiles, where a plurality of sets of group profile information associated with a plurality of group profiles are stored in a first plurality of user profiles.

FIG. 5C illustrates the plurality of sets of group profile information associated with the plurality of group profiles being stored in the first plurality of user profiles. In some examples, the first set of group profile information (shown with reference number 518) is stored in the first set of user profiles (shown with reference number 524) based upon a determination that the first set of devices associated with the first set of user profiles 524 correspond to the first group. Alternatively and/or additionally, the second set of group profile information (shown with reference number 520) is stored in the second set of user profiles (shown with reference number 526) based upon a determination that the second set of devices associated with the second set of user profiles 526 correspond to the second group. Alternatively and/or additionally, a third set of group profile information 522 is stored in a third set of user profiles 528 based upon a determination that a third set of devices associated with the third set of user profiles 528 correspond to the third group of the plurality of groups.

At 408, a first request for content associated with the first device of the first set of devices is received. The first request for content may be received responsive to the first device accessing a first internet resource associated with the content system (e.g., one or more of a web page of a website associated with the content system, an application associated with the content system, an internet game associated with the content system, etc.). For example, the first device may transmit a request to access the first internet resource to a first server associated with the first internet resource. Responsive to receiving the request to access the first internet resource, the first server associated with the first internet resource may transmit the first request for content to the content system (and/or to a second server associated with the content system). Alternatively and/or additionally, the first request for content may be received from the first device. In some examples, the first request for content may correspond to a request to be provided with a content item (e.g., an advertisement, an image, a link, a video, etc.) for presentation via the first internet resource.

Figure 5D:
FIG. 5D is a diagram illustrating an exemplary system for generating group profiles and/or selecting content for presentation via devices based upon group profiles, where a first device presents and/or accesses a first web page using a browser of the first device.

FIGS. 5D-5G illustrate an exemplary scenario in which the first request for content (shown with reference number 570 in FIG. 5G) is received. FIG. 5D illustrates the first device (shown with reference number 500) presenting and/or accessing a first web page 540 using a browser of the first device 500. The browser may comprise an address bar 534 comprising a web address (e.g., a uniform resource locator (URL)) of the first web page 540. The first web page 540 may comprise a search interface. For example, the search interface may comprise a web search engine designed to search for information throughout the internet. In some examples, the first web page 540 may comprise a search field 538. For example, a query "stock market" may be entered into the search field 538. In some examples, the first web page 540 may comprise a search selectable input 536 corresponding to performing a search based upon the query. For example, the search selectable input 536 may be selected.

Figure 5E:
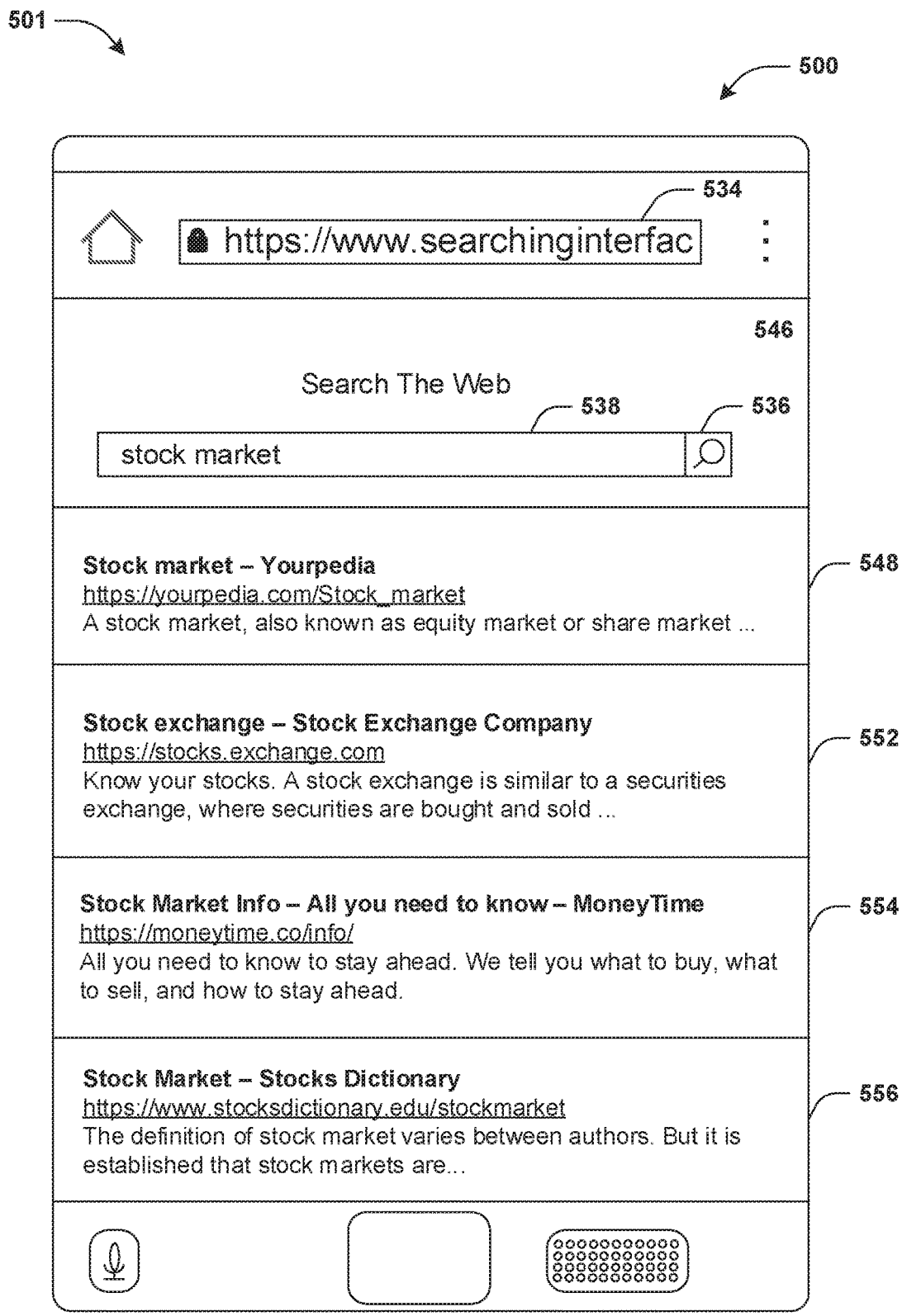
FIG. 5E is a diagram illustrating an exemplary system for generating group profiles and/or selecting content for presentation via devices based upon group profiles, where a first device presents a plurality of search results associated with a query.

FIG. 5E illustrates the first device 500 presenting a plurality of search results associated with the query using the browser of the first device 500. For example, the plurality of search results may be presented within a second web page 546. For example, the plurality of search results may comprise a first search result 548 corresponding to a third web page, a second search result 552 corresponding to a fourth web page 578 (illustrated in FIG. 5H), a third search result 554 corresponding to a fifth web page and/or a fourth search result 556 corresponding to a sixth web page.

In some examples, each search result of the plurality of search results may comprise a selectable input (e.g., a link) corresponding to accessing a web page associated with the search result. In some examples, the second search result 552 corresponding to the fourth web page 578 may be selected (e.g., the second search result 552 may be selected via a second selectable input corresponding to the second search result 552).

Figure 5F:
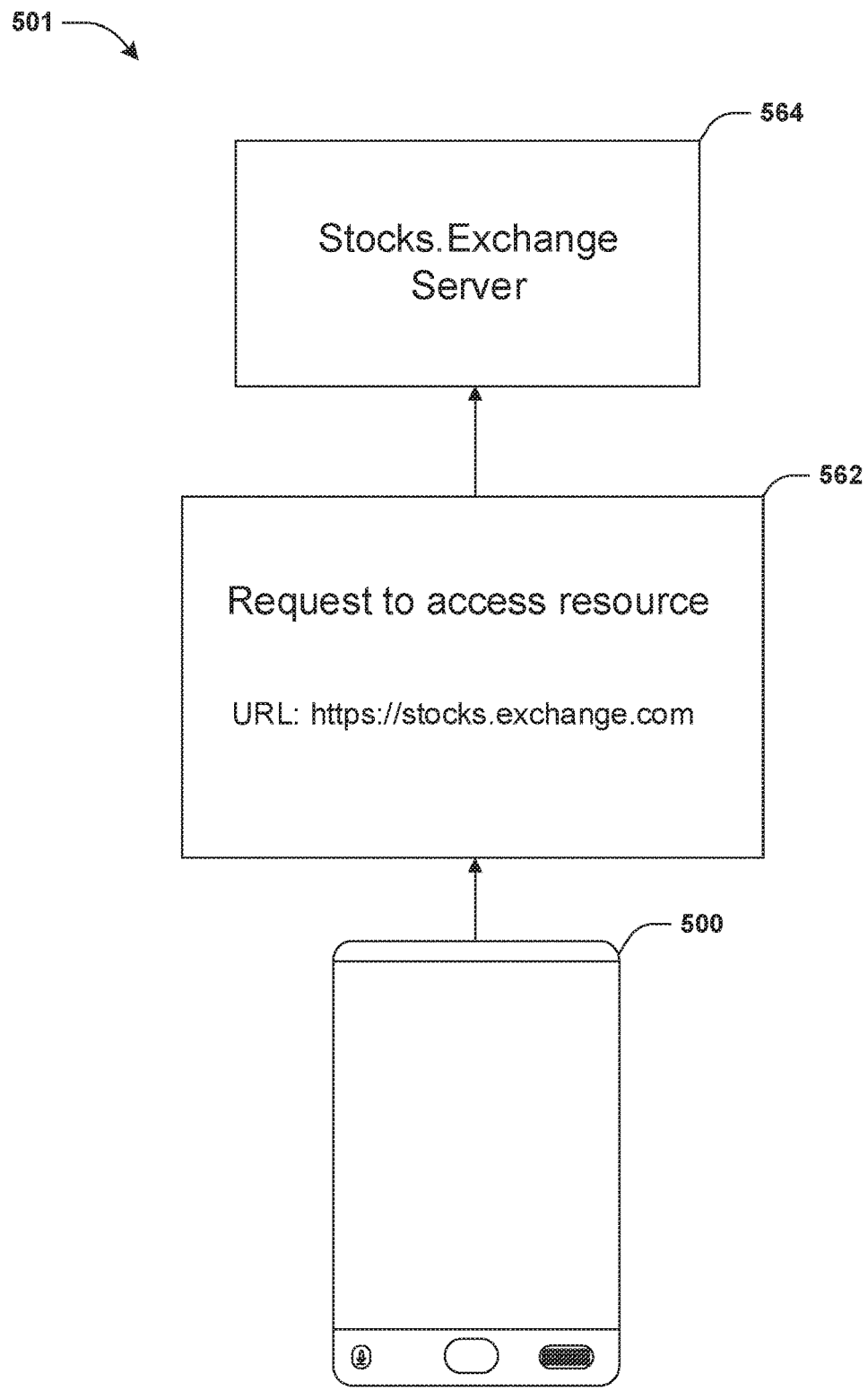
FIG. 5F is a diagram illustrating an exemplary system for generating group profiles and/or selecting content for presentation via devices based upon group profiles, where a first device transmits a request to access a resource to a first server.

FIG. 5F illustrates the first device 500 transmitting a request 562 to access a resource to a first server 564. In some examples, the request 562 to access the resource may be transmitted responsive to the second search result 552 being selected. For example, the resource may correspond to the fourth web page 578. For example, the request 562 to access the resource may comprise an indication of the fourth web page 578 (e.g., a web address "https://stocks.exchange.com"). Alternatively and/or additionally, the first server 564 may be associated with the fourth web page 578.

Figure 5G:
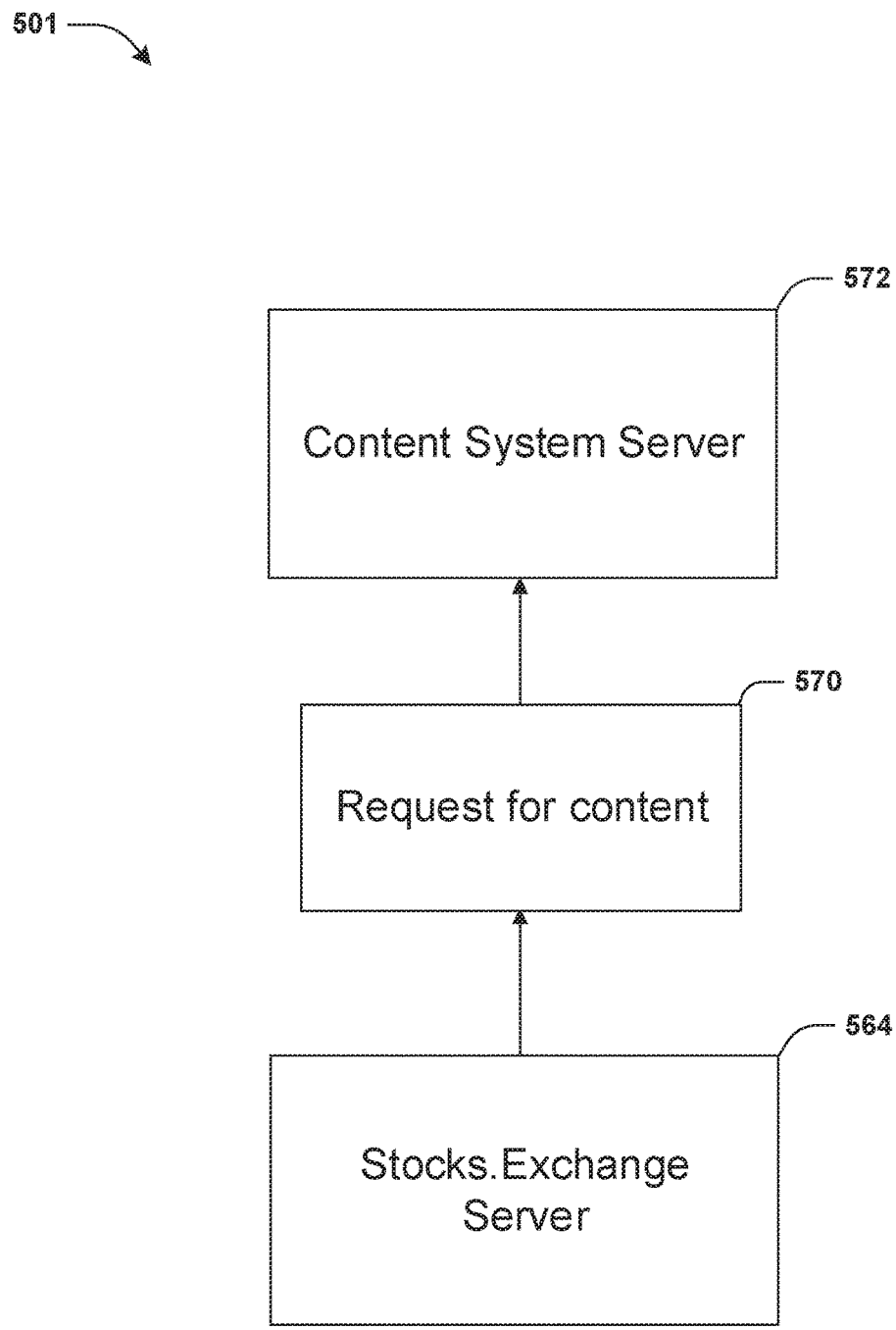
FIG. 5G is a diagram illustrating an exemplary system for generating group profiles and/or selecting content for presentation via devices based upon group profiles, where a first server transmits a first request for content to a second server associated with a content system.

FIG. 5G illustrates the first server 564 transmitting the first request for content 570 to a second server 572 associated with the content system. In some examples, the first request for content 570 may be transmitted (by the first server 564) responsive to receiving the request 562 to access the resource. Alternatively and/or additionally, the first request for content 570 may be transmitted (to the second server 572) by the first device 500. In some examples, the first request for content 570 may be a request to be provided with a content item (e.g., an advertisement, an image, a link, a video, etc.) for presentation via the fourth web page 578.

At 410, a first content item may be selected for presentation via the first device based upon the first group profile. In some examples, the user profile database is analyzed based upon the first request for content to identify the first user profile associated with the first device. For example, the first request for content may comprise second identification information associated with the first device. The second identification information may comprise second device identification information associated with the first device, such as at least one of a device identifier of the first device, an IP address associated with the first device, a client identifier of the first device etc. Alternatively and/or additionally, the second identification information may comprise second user identification information associated with the first user of the first device, such as at least one of an indication of the first user account, a user account identifier associated with the first user account, a username associated with the first user account, etc.

In some examples, the user profile database is analyzed based upon the second identification information to identify the first user profile. For example, the second identification information may be compared with the first identification information in the first user profile to determine that the first user profile is associated with the first request for content. In some examples, it may be determined that the first user profile is associated with the first request for content based upon a determination that at least a portion of the second identification information associated with the first request for content matches at least a portion of the first identification information in the first user profile.

In an example where the first set of group profile information stored in the first user profile comprises the first group profile, the first group profile may be used for selecting a content item for presentation via the first device based upon a determination that the first user profile comprises the first group profile. Alternatively and/or additionally, in an example where the first set of group profile information stored in the first user profile comprises the first indication of the first group profile, the first group profile may be used for selecting a content item for presentation via the first device based upon a determination that the first user profile comprises the first indication of the first group profile. For example, responsive to identifying the first indication of the first group profile, the first group profile may be accessed, such as based upon an identifier, a pointer, a reference, a link, etc. provided by the first indication of the first group profile.

In some examples, the first group profile may be used for selecting a content item for presentation via the first device based upon a privacy classification associated with the first device. In some examples, the privacy classification is stored in the first user profile. The privacy classification may be indicative of whether the first device is associated with a privacy requirement or whether the first device is not associated with a privacy requirement. In some examples, the privacy classification may be indicative of a privacy requirement based upon reception of a request not to use one or more sets of device information (e.g., at least a portion of the first device information) for selection of content items. Alternatively and/or additionally, the privacy classification may be indicative of a privacy requirement based upon a determination that consent to use the one or more sets of device information for selection of content items has not been received. Alternatively and/or additionally, the privacy classification may be indicative of a privacy requirement based upon a determination that one or more privacy regulations apply to the first device (e.g., a jurisdiction of the one or more privacy regulations covers the first user and/or the first device) and one or more requirements, such as defined by the one or more privacy regulations, for use of the one or more sets of device information have not been satisfied (e.g., the one or more requirements not being satisfied may correspond to at least one of consent having not been received, a request not to use the first user's user information having been received, etc.).

In an example where the privacy classification is indicative of a privacy requirement associated with the one or more sets of information, the first group profile may be used for selecting a content item for presentation via the first device. For example, the one or more sets of information associated with the privacy requirement may not be used for selecting a content item for presentation via the first device based upon a determination that the privacy classification is indicative of the privacy requirement. Alternatively and/or additionally, responsive to a determination that the privacy classification is indicative of the privacy requirement, a content item may be selected for presentation via the first device based upon the first group profile and/or a portion of the first set of device information that does not include the one or more sets of information associated with the privacy requirement.

In an example where the privacy classification is not indicative of a privacy requirement, the first set of device information and/or the first group profile may be used for selecting a content item for presentation via the first device.

In some examples, the first content item may be selected from a first plurality of content items for presentation via the first device. For example, responsive to receiving the first request for content associated with the first device, a bidding process may be performed to select the first content item from the first plurality of content items participating in an auction (e.g., an auction for selection of a content item to present via the first device). In some examples, the first plurality of content items (participating in the auction) comprise the first content item.

In some examples, a first plurality of bid values associated with the first plurality of content items may be determined. In some examples, the first plurality of bid values may be determined based upon budgets (e.g., daily budgets) and/or target spend patterns associated with the first plurality of content items. For example, the first plurality of bid values and/or the budgets may be received from devices associated with entities (e.g., advertisers, companies, brands, organizations, etc.) associated with the first plurality of content items. In some examples, the first plurality of bid values may comprise a first bid value associated with the first content item.

In some examples, the first content item may be selected from the first plurality of content items for presentation via the first device based upon the first plurality of bid values. For example, the first content item may be selected from the first plurality of content items based upon a determination that the first bid value associated with the first content item exceeds a threshold bid value. Alternatively and/or additionally, the first content item may be selected from the first plurality of content items based upon a determination that the first bid value is greater than one or more other bid values of the first plurality of bid values. Alternatively and/or additionally, the first content item may be selected from the first plurality of content items based upon a determination that the first bid value is a highest bid value of the first plurality of bid values.

Alternatively and/or additionally, a first plurality of content item scores associated with the first plurality of content items may be determined. For example, the first plurality of content item scores may be determined based upon the first plurality of bid values and/or a first plurality of click probabilities associated with the first plurality of content items. The first plurality of click probabilities may be determined based upon content item information associated with the first plurality of content items and/or the first group profile associated with the first device. In some examples, a click probability of the first plurality of click probabilities may correspond to a probability of receiving a selection of a content item responsive to presenting the content item via a device of the first set of devices corresponding to the first group (e.g., the first device). Alternatively and/or additionally, a click probability of the first click probabilities may correspond to a probability of receiving a positive signal responsive to presenting a content item via a device of the first set of devices corresponding to the first group (e.g., the first device). The positive signal may be indicative of the content item being consumed by the first user. Alternatively and/or additionally, the positive signal may be indicative of one or more user interactions with the content item. Alternatively and/or additionally, the positive signal may be indicative of the content item being presented (and/or the content item being presented for longer than a threshold duration of time) via the first device.

In some examples, the first content item may be selected from the first plurality of content items for presentation via the first device based upon the first plurality of content item scores. For example, the first content item may be selected from the first plurality of content items based upon a determination that a first content item score associated with the first content item exceeds a threshold content item score. Alternatively and/or additionally, the first content item may be selected from the first plurality of content items based upon a determination that the first content item score is greater than one or more other content item scores of the first plurality of content item scores. Alternatively and/or additionally, the first content item may be selected from the first plurality of content items based upon a determination that the first content item score is a highest content item score of the first plurality of content item scores.

In some examples, the first content item may be selected for presentation via the first device based upon first content information received from a first entity associated with the first content item. In some examples, the first entity may access and/or interact with a service, such as an advertising service, that provides a platform for uploading, to the content system, content to be presented via devices. In some examples, the first entity may be an advertiser, a company, a brand, an organization, etc. One or more content items (e.g., one or more advertisements) associated with the first entity may be received from a device associated with the first entity. The one or more content items may comprise the first content item. The one or more content items may be associated with one or more products, one or more services, etc. associated with the first entity. For example, the first entity may upload, to the content system, the one or more content items. The one or more content items may be associated with a content campaign for promoting the one or more products and/or the one or more services associated with the first entity. Alternatively and/or additionally, the first content information associated with the content campaign may be received from the device associated with the first entity. For example, the first content information may comprise one or more of a first budget associated with the content campaign, a first target spend pattern associated with the content campaign, a duration of time for which the one or more content items shall be presented by the content system, one or more campaign goals associated with the content campaign and/or the one or more content items (e.g., the one or more campaign goals may correspond to a quantity of impressions associated with the one or more content items, a quantity of interactions associated with the one or more content items, a quantity of conversion events performed as a result of the content campaign, etc.), etc.

In some examples, one or more target groups associated with the content campaign may be selected from the plurality of groups based upon the first content information. In some examples, the one or more target groups may correspond to one or more groups of the plurality of groups to which the one or more content items (comprising the first content item) associated with the content campaign shall be targeted and/or presented. For example, the first content information may be indicative of one or more target characteristics (e.g., characteristics of a target audience) of users to which the one or more content items (e.g., the first content item) shall be targeted and/or presented. In an example, the first group may be selected for inclusion in the one or more target groups based upon a determination that one or more characteristics indicated by the first group profile matches one or more characteristics of the one or more target characteristics. Alternatively and/or additionally, the first content information may be indicative of the one or more target groups. For example, it may be determined that the first group is included in the one or more target groups based upon an indication of the first group in the first content information.

In some examples, the first content item may be included in the auction (and/or in the first plurality of content items associated with the auction) based upon a determination that the one or more target groups associated with the content campaign comprise the first group corresponding to the first device.

In some examples, the first bid value may be determined based upon the first content information associated with the content campaign. For example, the first bid value may be determined based upon the first budget associated with the content campaign, the first target spend pattern associated with the content campaign and/or the one or more target groups associated with the content campaign. In some examples, the first bid value may be reduced (and/or the first bid value may be set to zero) based upon a determination that the one or more target groups do not comprise the first group corresponding to the first device. Alternatively and/or additionally, the first bid value may not be reduced (and/or the first bid value may be increased) responsive to a determination that the one or more target groups comprise the first group corresponding to the first device.

In some examples, the first content item may be transmitted to the first device responsive to selecting the first content item for presentation via the first device. The first content item may be presented via the first device. For example, the first content item may be presented via the first internet resource on the first device, such as while the first internet resource is accessed and/or displayed.

Figure 5H:
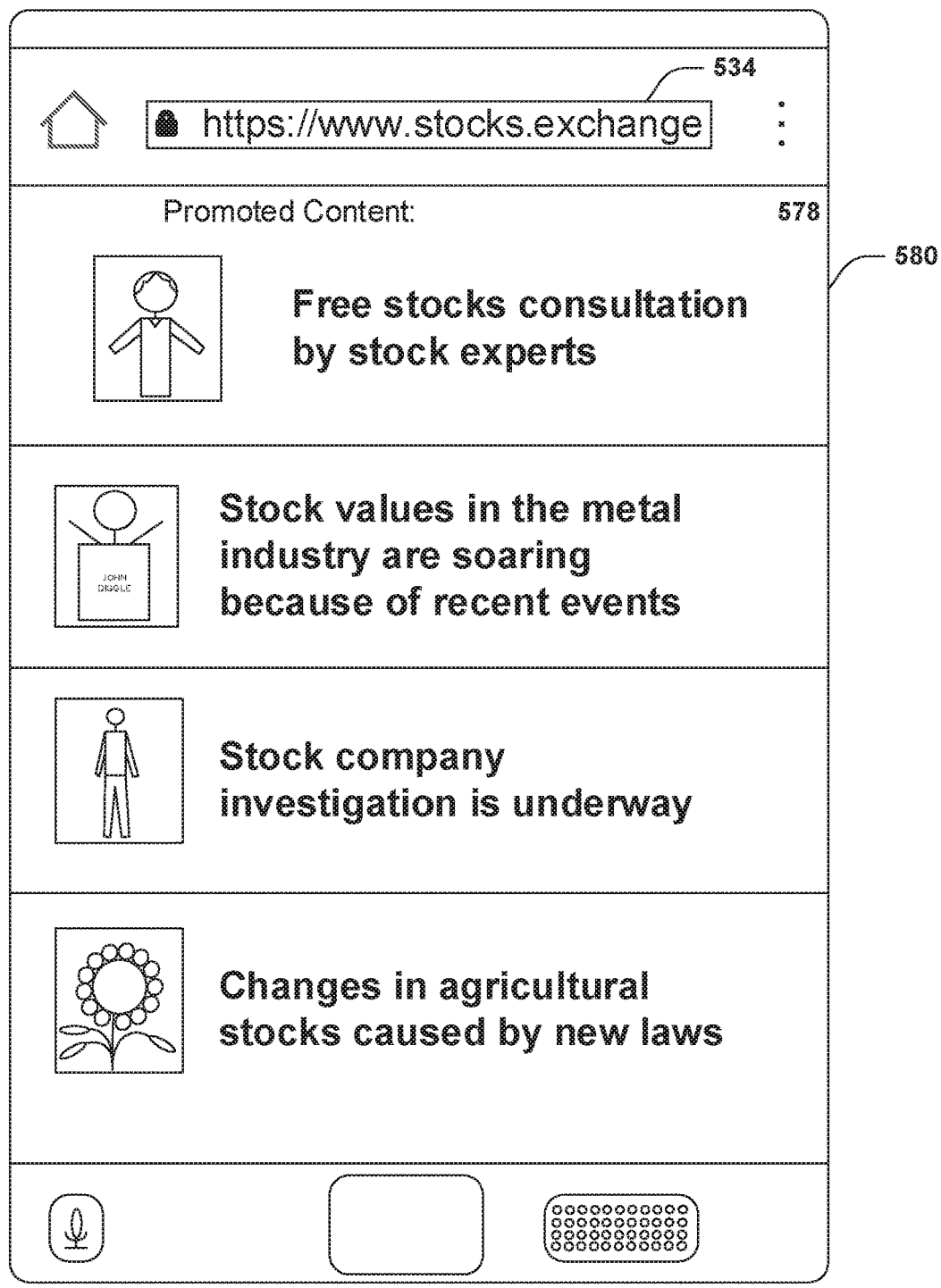
FIG. 5H is a diagram illustrating an exemplary system for generating group profiles and/or selecting content for presentation via devices based upon group profiles, where a first device presents a first content item.

FIG. 5H illustrates an exemplary scenario in which the first device (shown with reference number 500) presents the first content item (shown with reference number 580). For example, the content system may provide the first content item 580 to be presented via the first internet resource (e.g., the fourth web page 578) while the first internet resource is accessed and/or displayed by the first device 500.

In some examples, a first content event associated with the first content item may be detected. In some examples, a first transaction identifier, associated with the first content event, may be generated responsive to detecting the first content event. In some examples, the first content event may correspond to the first content item being transmitted to the first device. For example, the first content event may be detected by determining that the first content item is transmitted to the first device. The first transaction identifier may be generated responsive to determining that the first content item is transmitted to the first device.

Alternatively and/or additionally, the first content event may correspond to the first content item being presented via the first device. For example, the first content event may be detected by determining that the first content item is presented via the first device. The first transaction identifier may be generated responsive to determining that the first content item is presented via the first device. Alternatively and/or additionally, the first content event may be detected by determining that at least a threshold proportion of the first content item is presented and/or displayed via the first device (e.g., the threshold proportion may correspond to 50% of the first content item and/or a different proportion of the first content item). For example, the first transaction identifier may be generated responsive to determining that a portion of the first content item that is displayed via the first device meets the threshold proportion. Alternatively and/or additionally, the first transaction identifier may not be generated responsive to a determining that a portion of the first content item that is displayed via the first device does not meet the threshold proportion.

Alternatively and/or additionally, the first content event may correspond to a selection of the first content item via the first device. For example, the first content event may be detected by detecting a selection of the first content item via the first device. For example, the first transaction identifier may be generated responsive to receiving a message, indicative of the selection of the first content item, from the first device (and/or from a server associated with the first internet resource and/or the first content item). In some examples, a web page associated with the first entity may be accessed and/or presented by the first device responsive to the selection of the first content item.

In some examples, a first set of transaction information associated with the first transaction identifier may be stored in a transaction data structure. In some examples, the first set of transaction information may be indicative of the first transaction identifier, the first content event, the first content item and/or the first entity associated with the first content item. Alternatively and/or additionally, the first set of transaction information may comprise the first identification information associated with the first device (and/or other identification information associated with the first device). Alternatively and/or additionally, the first set of transaction information may comprise an indication of the first group to which the first device associated with the first content event belongs.

Figure 5I:
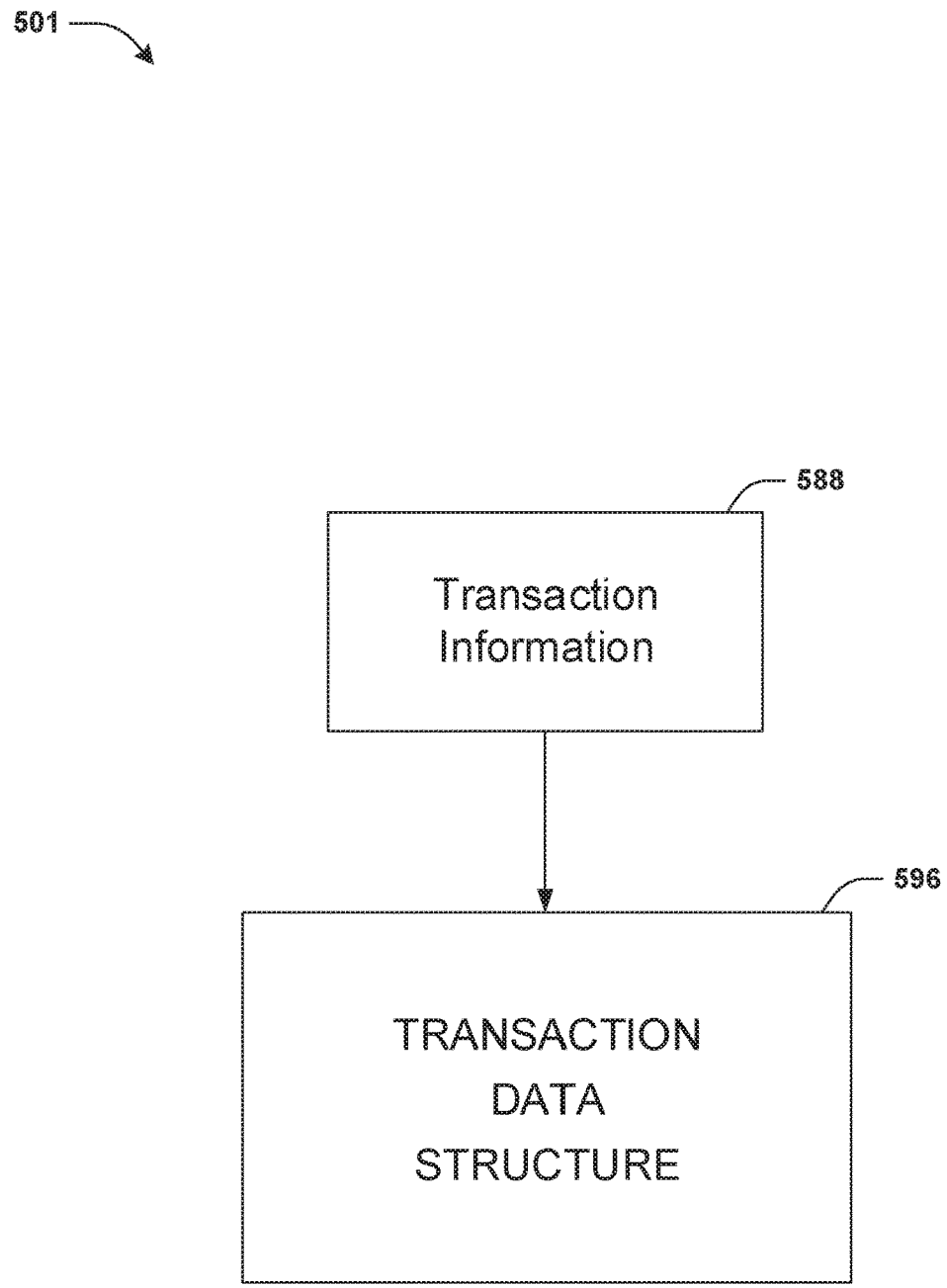
FIG. 5I is a diagram illustrating an exemplary system for generating group profiles and/or selecting content for presentation via devices based upon group profiles, where a first set of transaction information is stored in a transaction data structure.

FIG. 5I illustrates an exemplary scenario in which the first set of transaction information (shown with reference number 588) is stored in the transaction data structure (shown with reference number 596).

In some examples, the transaction data structure may comprise a plurality of sets of transaction information. The plurality of sets of transaction information may comprise the first set of transaction information. In some examples, a set of transaction information of the plurality of sets of transaction information (and/or each set of transaction information of the plurality of sets of transaction information) may comprise a transaction identifier, an indication of a content event, a content item associated with the content event, an entity associated with the content item and/or a group (of the plurality of groups) associated with the content event (and/or identification information associated with a device that received and/or presented the content item).

In some examples, a transaction message comprising the first transaction identifier may be transmitted to a server associated with the first content item and/or the first entity. For example, the transaction message may be transmitted to a first entity system associated with the first entity. The transaction message may be indicative of the first content item being presented via a device. Alternatively and/or additionally, the transaction message may be indicative of the first content item being presented via a device belonging to the first group. Alternatively and/or additionally, the transaction message may be indicative of the first content item being transmitted to a device. Alternatively and/or additionally, the transaction message may be indicative of the first content item being transmitted to a device belonging to the first group. Alternatively and/or additionally, the transaction message may be indicative of the first content item being selected via a device. Alternatively and/or additionally, the transaction message may be indicative of the first content item being selected via a device belonging to the first group. Alternatively and/or additionally, the transaction message may be indicative of the first internet resource on which the first content item is presented, a time that the first content item is transmitted to the first device and/or a time that the first content item is presented via the first device and/or the first internet resource.

Figure 5J:
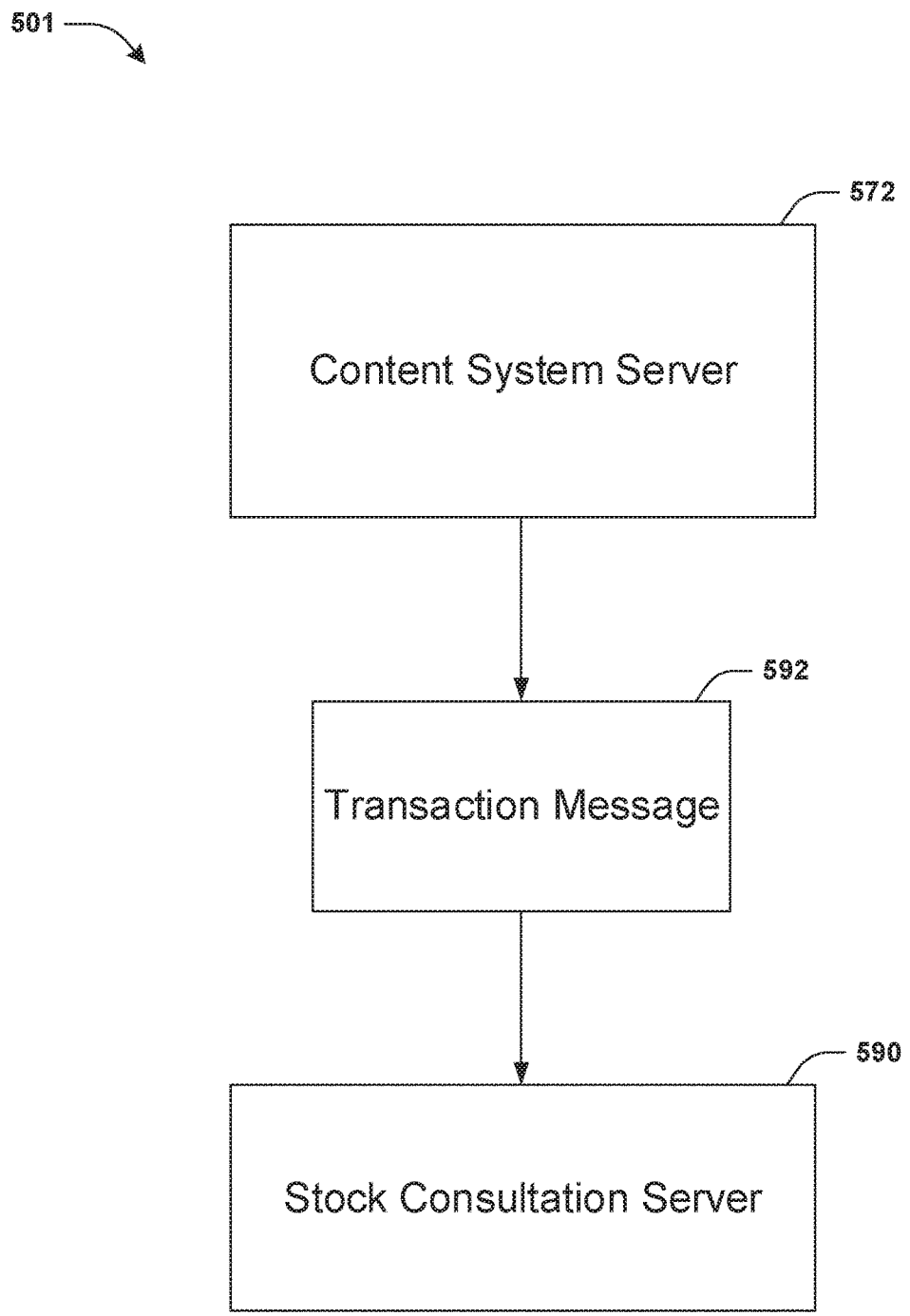
FIG. 5J is a diagram illustrating an exemplary system for generating group profiles and/or selecting content for presentation via devices based upon group profiles, where a transaction message is transmitted to a server associated with a first content item and/or a first entity.

FIG. 5J illustrates an exemplary scenario in which the transaction message (shown with reference number 592) is transmitted to a server associated with the first content item and/or the first entity. For example, the second server 572 associated with the content system may transmit the transaction message 592 to a third server 590 associated with the first content item and/or the first entity.

In some examples, the transaction identifier may be used by the first entity system to keep track of one or more events, such as one or more conversion events, associated with the first content item and/or the first content event. In some examples, a first conversion event associated with the first content event may be detected by the first entity system. In some examples, the first conversion event may correspond to at least one of a purchase of a product associated with the first entity, a purchase of a service associated with the first entity, subscribing to (and/or signing up for) a service associated with the first entity, contacting the first entity (e.g., contacting the first entity via one or more of email, phone, etc.), a selection of a content item associated with the first entity, an interaction with a content item associated with the first entity, accessing a web page associated with the first entity, adding a product and/or a service associated with the first entity to a shopping cart on an online shopping platform, completing a form (e.g., a survey form), creating and/or registering an account (e.g., a user account) for a platform associated with the first entity (e.g., creating a shopping user account for an online shopping platform), downloading an application (e.g., a mobile application) associated with the first entity onto the first device and/or installing the application on the first device, opening and/or interacting with the application, utilizing one or more services associated with the first entity using the application, etc.

In some examples, the first entity system may determine that the first conversion event is associated with the first transaction identifier based upon a determination that one or more characteristics of the first conversion event match and/or correlate to one or more characteristics indicated by the transaction message and/or the first content item. In an example, the first conversion event may correspond to a selection of the first content item while the first content item is presented via the first device. A second internet resource associated with the first entity system may be accessed by the first device responsive to the selection of the first content item. In some examples, it may be determined that the first conversion event is associated with the first transaction identifier based upon a determination that the second internet resource is accessed via a selection of the first content item presented on the first internet resource indicated by the transaction message. Alternatively and/or additionally, it may be determined that the first conversion event is associated with the first transaction identifier based upon a determination that a time that the second internet resource is accessed corresponds to (e.g., matches and/or is within a threshold duration of time of) a time that the first content item is transmitted to the first device (as indicated by the transaction message) and/or a time that the first content item is presented via the first device (as indicated by the transaction message).

In some examples, the first conversion event may correspond to one or more events performed after the selection of the first content item. For example, the first conversion event may correspond to at least one of a purchase of a product and/or a service associated with the first entity, adding a product and/or a service associated with the first entity to a shopping cart, creating and/or registering an account (e.g., a user account) for a platform associated with the first entity, etc. In an example, it may be determined that the first conversion event is associated with the first transaction identifier based upon a determination that the first conversion event is performed by a same device as a device (e.g., the first device) associated with the first transaction identifier that selected the first content item.

In some examples, the first conversion event may correspond to one or more events performed after the first content event. In some examples, it may be determined that the first conversion event is associated with the first transaction identifier based upon a determination that the first conversion event is performed using a unique identifier presented via the first content item when the first content item is presented via the first device on the first internet resource. In an example, the unique identifier may correspond to a coupon code and/or the conversion event may correspond to a purchase of a product and/or a service using the coupon code. In some examples, it may be determined that the first conversion event is associated with the first transaction identifier based upon a determination that the first transaction identifier is associated with the unique identifier (e.g., the coupon code) used to perform the conversion event. For example, it may be determined that the first transaction identifier is associated with the unique identifier based upon a determination that the transaction message comprises an indication of the unique identifier.

In some examples, first conversion information comprising the first transaction identifier may be received. The first conversion information may be indicative of the first conversion event associated with the first transaction identifier.

In some examples, the first conversion information may be received from the first entity system. For example, the first entity system may generate the first conversion information responsive to detecting the first conversion event. In some examples, the first entity system may transmit the first conversion information to the first content system responsive to detecting the first conversion event.

Figure 5K:
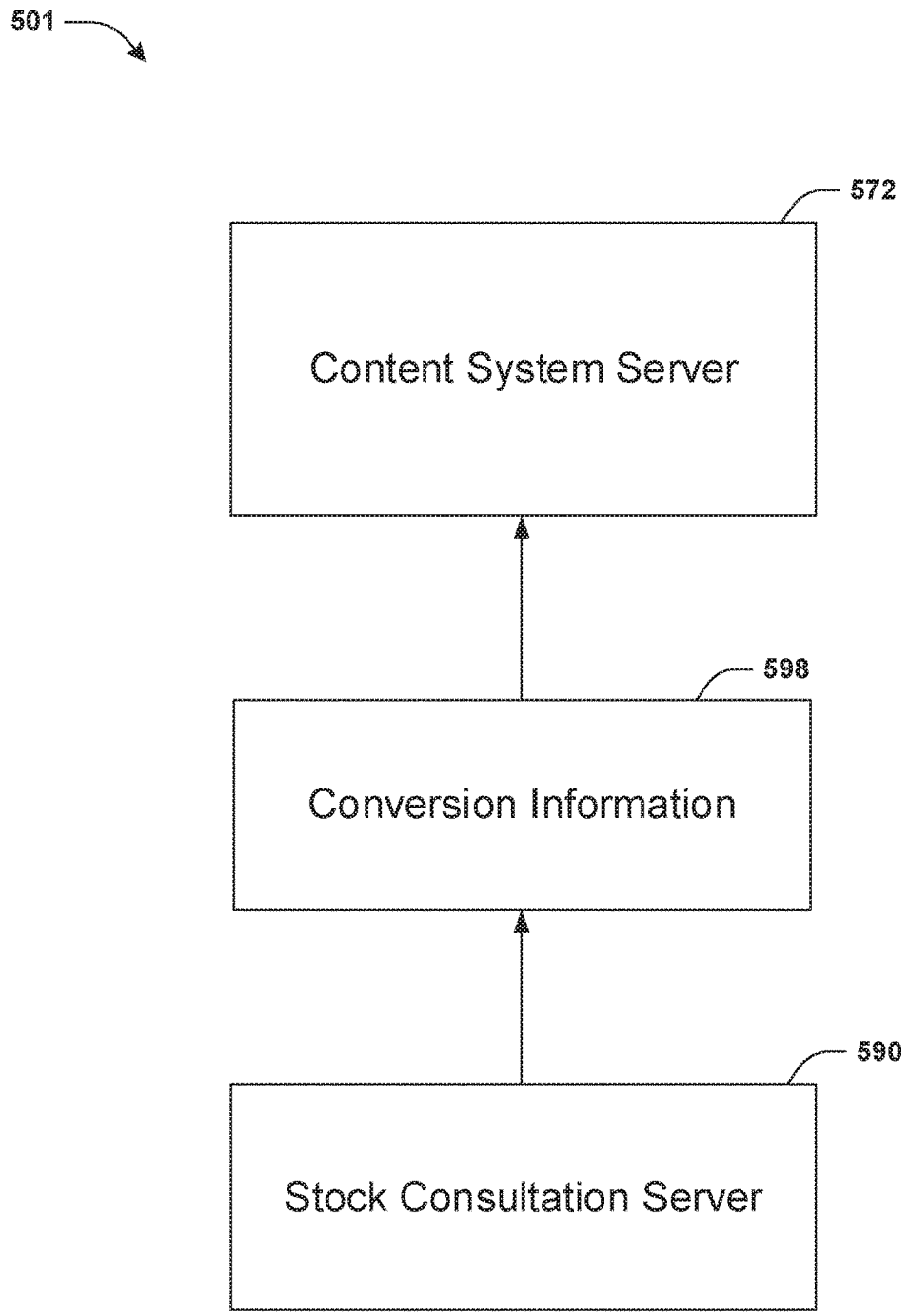
FIG. 5K is a diagram illustrating an exemplary system for generating group profiles and/or selecting content for presentation via devices based upon group profiles, where first conversion information is received from a first entity system.

FIG. 5K illustrates an exemplary scenario in which the first conversion information (shown with reference number 598) is received from the first entity system. For example, the third server 590 associated with the first entity may transmit the first conversion information 598 to the second server 572 associated with the content system.

In some examples, the transaction database may be analyzed based upon the first conversion information to identify the first set of transaction information associated with the first conversion event. In an example where the first set of transaction information comprises the first identification information associated with the first device (and/or other identification information associated with the first device), it may be determined that the first conversion event is associated with the presentation of the first content item via the first device (and/or the transmission of the first content item to the first device) based upon a determination that the first set of transaction information and the first conversion information both comprise the first transaction identifier. Alternatively and/or additionally, it may be determined that the first conversion event is associated with the first group based upon a determination that the first device belongs to the first group.

In an example where the first set of transaction information comprises an indication of the first group, it may be determined that the first conversion event is associated with presentation of the first content item via a device belonging to the first group based upon a determination that the first set of transaction information and the first conversion information both comprise the first transaction identifier.

In some examples, one or more sets of conversion information comprising the first conversion information may be received. The one or more sets of conversion information may be associated with a first set of conversion events, comprising the first conversion event, associated with the first group. For example, each conversion event of the first set of conversion events may be performed by a device and/or a user associated with the first group. Alternatively and/or additionally, each conversion event of the first set of conversion events may be attributed to presentation of the first content item (and/or presentation of a different content item associated with the first entity and/or the content campaign) via a device of the first set of devices corresponding to the first group. For example, it may be determined that each conversion event of the first set of conversion events is due to presentation of the first content item (and/or presentation a different content item associated with the first entity and/or the content campaign) via a device of the first set of devices corresponding to the first group. Alternatively and/or additionally, it may be determined that each conversion event of the first set of conversion events is likely due to presentation of the first content item (and/or presentation a different content item associated with the first entity and/or the content campaign) via a device of the first set of devices corresponding to the first group (e.g., a determination that a conversion event of the first set of conversion events is likely due to presentation of the first content item corresponds to a determination of a probability, that the conversion event is performed as a result of the presentation of the first content item, exceeds a threshold probability).

In some examples, a first set of conversion characteristics associated with the first group and/or the first entity may be determined based upon the one or more sets of conversion information and/or the first group. For example, the first set of conversion characteristics may comprise at least one of a first conversion rate associated with the first entity, a first quantity of conversion events associated with the first entity, etc.

In some examples, the first conversion rate of the first set of conversion characteristics may be determined based upon the one or more sets of conversion information and/or a first quantity of devices of the first group that performed a content event associated with the first entity. The first quantity of devices may correspond to a quantity of devices of the first set of devices that at least one of received the first content item, presented the first content item, selected the first content item, etc. The first conversion rate may correspond to a proportion, of devices (belonging to the first group) that performed a content event associated with the first entity, that also performed a conversion event associated with the first entity (e.g., the first conversion rate may indicate that 30% of the devices that performed a content event associated with the first entity also performed a conversion event associated with the first entity). Alternatively and/or additionally, the first conversion rate may correspond to a rate at which conversion events are performed by devices belonging to the first group (e.g., a quantity of conversion events performed by devices belonging to the first group per unit of time). Alternatively and/or additionally, the first conversion rate may correspond to an average quantity of conversion events performed by each device belonging to the first group that performed a content event associated with the first entity (e.g., 0.6 conversion events per device).

In some examples, the first quantity of conversion events of the first set of conversion characteristics may be determined based upon one or more sets of conversion information. For example, the first quantity of conversion events may correspond to a quantity of the first set of conversion events.

In some examples, the first set of conversion characteristics corresponds to a first type of conversion event. For example, the first set of conversion characteristics may be determined based upon one or more conversion events, of the first set of conversion events, associated with the first type of conversion event.

In some examples, a plurality of sets of conversion characteristics, corresponding to a plurality of types of conversion events, may be determined. The plurality of sets of conversion characteristics may comprise the first set of conversion characteristics and/or the plurality of types of conversion events may comprise the first type of conversion event.

In an example, the first type of conversion event may correspond to a purchase of a product and/or a service associated with the first entity. In the example, the first set of conversion characteristics corresponding to the first type of conversion event may be indicative of a rate at which devices of the first group, that performed a content event associated with the first entity, purchased a product and/or a service associated with the first entity. Alternatively and/or additionally, the first set of conversion characteristics may be indicative of a quantity of devices of the first group that purchased a product and/or a service associated with the first entity.

In an example, a second type of conversion event of the plurality of types of conversion events may correspond to adding a product and/or a service associated with the first entity to a shopping cart on an online shopping platform. The plurality of sets of conversion characteristics may comprise a second set of conversion characteristics corresponding to the second type of conversion event. The second set of conversion characteristics may be indicative of a rate at which devices of the first group, that performed a content event associated with the first entity, added a product and/or a service associated with the first entity to a shopping cart. Alternatively and/or additionally, the second set of conversion characteristics may be indicative of a quantity of devices of the first group that added a product and/or a service associated with the first entity to a shopping cart.

In an example, a third type of conversion event of the plurality of types of conversion events may correspond to adding a product associated with the first entity to a shopping cart on an online shopping platform and not performing a purchase of the product within a threshold duration of time after adding the product to the shopping cart. The plurality of sets of conversion characteristics may comprise a third set of conversion characteristics corresponding to the third type of conversion event. The third set of conversion characteristics may be indicative of a rate at which devices of the first group, that performed a content event associated with the first entity, added a product and/or a service associated with the first entity to a shopping cart and did not purchase the product within the threshold duration of time after adding the product to the shopping cart. Alternatively and/or additionally, the third set of conversion characteristics may be indicative of a quantity of devices of the first group that added a product and/or a service associated with the first entity to a shopping cart and did not purchase the product within the threshold duration of time after adding the product to the shopping cart.

In some examples, the one or more sets of conversion information, the first set of conversion characteristics and/or the plurality of sets of conversion characteristics (comprising the first set of conversion characteristics) may be used for determining a conversion score associated with devices belonging to the first group. The conversion score may be indicative of a probability of a device belonging to the first group performing a conversion event associated with the first entity after the first content item (and/or a different content item associated with the first entity and/or the content campaign) is presented via the device.

Alternatively and/or additionally, the one or more sets of conversion information, the first set of conversion characteristics and/or the plurality of sets of conversion characteristics (comprising the first set of conversion characteristics) may be used for determining a plurality of conversion scores associated with devices belonging to the first group. In some examples, a conversion score of the plurality of conversion scores may be associated with a type of conversion event of the plurality of types of conversion events. In an example, a first conversion score of the plurality of conversion scores may be associated with the first type of conversion event, a second conversion score of the plurality of conversion scores may be associated with the second type of conversion event, etc. In an example where the first type of conversion event corresponds to a purchase of a product and/or a service associated with the first entity, the first conversion score may correspond to a probability of a device belonging to the first group purchasing a product and/or a service associated with the first entity after the first content item (and/or a different content item associated with the first entity and/or the content campaign) is presented via the device.

In some examples, the first group profile may be modified based upon the one or more sets of conversion information, the first set of conversion characteristics, the plurality of sets of conversion characteristics and/or one or more conversion scores associated with the first entity. For example, a first set of entity conversion information indicative of the one or more sets of conversion information, the first set of conversion characteristics, the plurality of sets of conversion characteristics and/or the one or more conversion scores may be included in the first group profile associated with the first group. In some examples, the first group profile may comprise a plurality of sets of entity conversion information comprising the first set of entity conversion information. The plurality of sets of entity conversion information may be associated with a plurality of entities. For example, a set of entity conversion information of the plurality of sets of entity conversion information may be indicative of one or more conversion characteristics and/or one or more conversion scores associated with an entity of the plurality of entities.

In some examples, transmission of one or more content items to devices belonging to the first group may be controlled based upon the plurality of sets of entity conversion information. For example, content may be selected for presentation via a device belonging to the first group based upon the plurality of sets of entity conversion information associated with plurality of entities (comprising the first set of entity conversion information associated with the first entity). In an example, a second request for content associated with a second device belonging to the first group may be received. In some examples, a content item may be selected from a second plurality of content items for presentation via the second device based upon the first group profile. In some examples, a plurality of conversion probabilities associated with the second plurality of content items may be determined based upon the plurality of sets of entity conversion information.

A first conversion probability of the plurality of conversion probabilities may be associated with the first content item and/or the first entity. The first conversion probability may correspond to a probability of the second device performing a conversion event associated with the first entity after the first content item (and/or a different content item associated with the first entity and/or the content campaign) is presented via the second device. In some examples, the first conversion probability may be determined based upon the first set of entity conversion information associated with the first group and/or the first entity. For example, the first conversion probability may be determined based upon the first set of conversion characteristics, the plurality of sets of conversion characteristics and/or one or more conversion scores indicated by the first set of entity conversion information.

In some examples, a content item may be selected for presentation via the second device based upon the plurality of conversion probabilities associated with the second plurality of content items, a second plurality of bid values associated with the second plurality of content items and/or a second plurality of click probabilities associated with the second plurality of content items. For example, a second plurality of content item scores associated with the second plurality of content items may be determined. The second plurality of content item scores may be determined based upon the plurality of conversion probabilities, the second plurality of bid values and/or the second plurality of click probabilities. A second content item may be selected from the second plurality of content items for presentation via the second device based upon the second plurality of content item scores. For example, the second content item may be selected from the second plurality of content items based upon a determination that a second content item score associated with the second content item exceeds a threshold content item score. Alternatively and/or additionally, the second content item may be selected from the second plurality of content items based upon a determination that the second content item score is greater than one or more other content item scores of the second plurality of content item scores. Alternatively and/or additionally, the second content item may be selected from the second plurality of content items based upon a determination that the second content item score is a highest content item score of the second plurality of content item scores.

It may be appreciated that controlling transmission of content items to devices belonging to the first group based upon the first plurality of sets of entity conversion information associated with the plurality of entities may create a closed-loop process allowing content events and/or conversion events associated with content items as feedback to tailor parameters of the content system (such as by receiving conversion information indicative of conversion events associated with the first group, analyzing the conversion information to determine conversion characteristics and/or conversion scores associated with the first group, determining conversion probabilities associated with entities based upon the conversion characteristics and/or the conversion scores, selecting content for presentation via a device belonging to the first group based upon the conversion probabilities, etc.). Closed-loop control may reduce errors and produce more efficient operation of a computer system which implements the content system. The reduction of errors and/or the efficient operation of the computer system may improve operational stability and/or predictability of operation. Accordingly, using processing circuitry to implement closed loop control described herein may improve operation of underlying hardware of the computer system.

It may be appreciated that the disclosed subject matter may assist a user (and/or a client device associated with the user) in accessing, interacting with and/or consuming internet resources without information that the user considers private information being used for selection of the internet resources. For example, rather than using the user's private information for selecting content, content may be selected for presentation via the client device based upon a group profile corresponding to a group to which the client device belongs. For example, the group profile may not comprise user identifiable information that directly identifies activity, demographics, etc. of the user. Rather, the group profile may comprise an estimation of characteristics of the group as a whole. Thus, by using the group profile for selection of content to present to the user, the user's private information may not be used directly for the selection of content. Alternatively and/or additionally, by using the group profile for selection of content to present to the user, selected content presented to the user may be of interest to the user.

Implementation of at least some of the disclosed subject matter may lead to benefits including, but not limited to, enabling the content system to select content for presentation via devices without using information users deem private.

Alternatively and/or additionally, implementing one or more of the techniques presented herein may enable the content system to select content for presentation via devices without conflicting with one or more regulations, such as one or more privacy regulations (e.g., as a result of generating the plurality of group profiles based upon the one or more regulations, as a result of determining whether to use a group profile associated with a device or a set of device information associated with the device based upon a privacy classification associated with the device, etc.).

Alternatively and/or additionally, implementing one or more of the techniques presented herein may enable the content system to determine and/or identify conversion events associated with the plurality of groups without transmitting identification information (e.g., at least one of IP addresses, client identifiers, device identifiers, usernames, etc.) associated with devices to external systems (e.g., as a result of generating a transaction identifier responsive to detecting a content event, as a result of storing a set of transaction information indicative of the content event and/or the transaction identifier, as a result of transmitting a transaction message comprising the transaction identifier to a system, as a result of receiving conversion information indicative of a conversion event, as a result of determining that the conversion event is associated with a group of the plurality of groups based upon a determination that the conversion information comprises the transaction identifier, etc.).

Alternatively and/or additionally, implementing one or more of the techniques presented herein may lead to benefits including increased efficiency and/or speed for selecting and/or providing content to devices. The increased efficiency and/or speed may be a result of grouping the first plurality of devices into the plurality of groups, generating the plurality of group profiles associated with the plurality of groups and/or selecting content for transmission to devices based upon the plurality of group profiles. An amount of information used for selecting content based upon the plurality of group profiles is reduced compared with selection of content based upon the first plurality of sets of device information. Thus, an amount of time and/or a complexity of operations for selecting content based upon the plurality of group profiles is reduced compared with selection of content based upon the first plurality of sets of device information.

Alternatively and/or additionally, implementing one or more of the techniques presented herein may lead to benefits including a reduction in memory usage. The reduction in memory usage may be a result of grouping the first plurality of devices into the plurality of groups, generating the plurality of group profiles associated with the plurality of groups and/or storing indications of the plurality of group profiles in the first plurality of user profiles associated with the first plurality of devices. For example, indications of the plurality of group profiles may be stored in the first plurality of user profiles in place of at least one of group profiles, sets of device information, etc. Thus, an amount of data contained within the first plurality of user profiles is reduced compared with the first plurality of user profiles each having a group profile and/or a set of device information.

In some examples, at least some of the disclosed subject matter may be implemented on a client device, and in some examples, at least some of the disclosed subject matter may be implemented on a server (e.g., hosting a service accessible via a network, such as the Internet).

Figure 6:
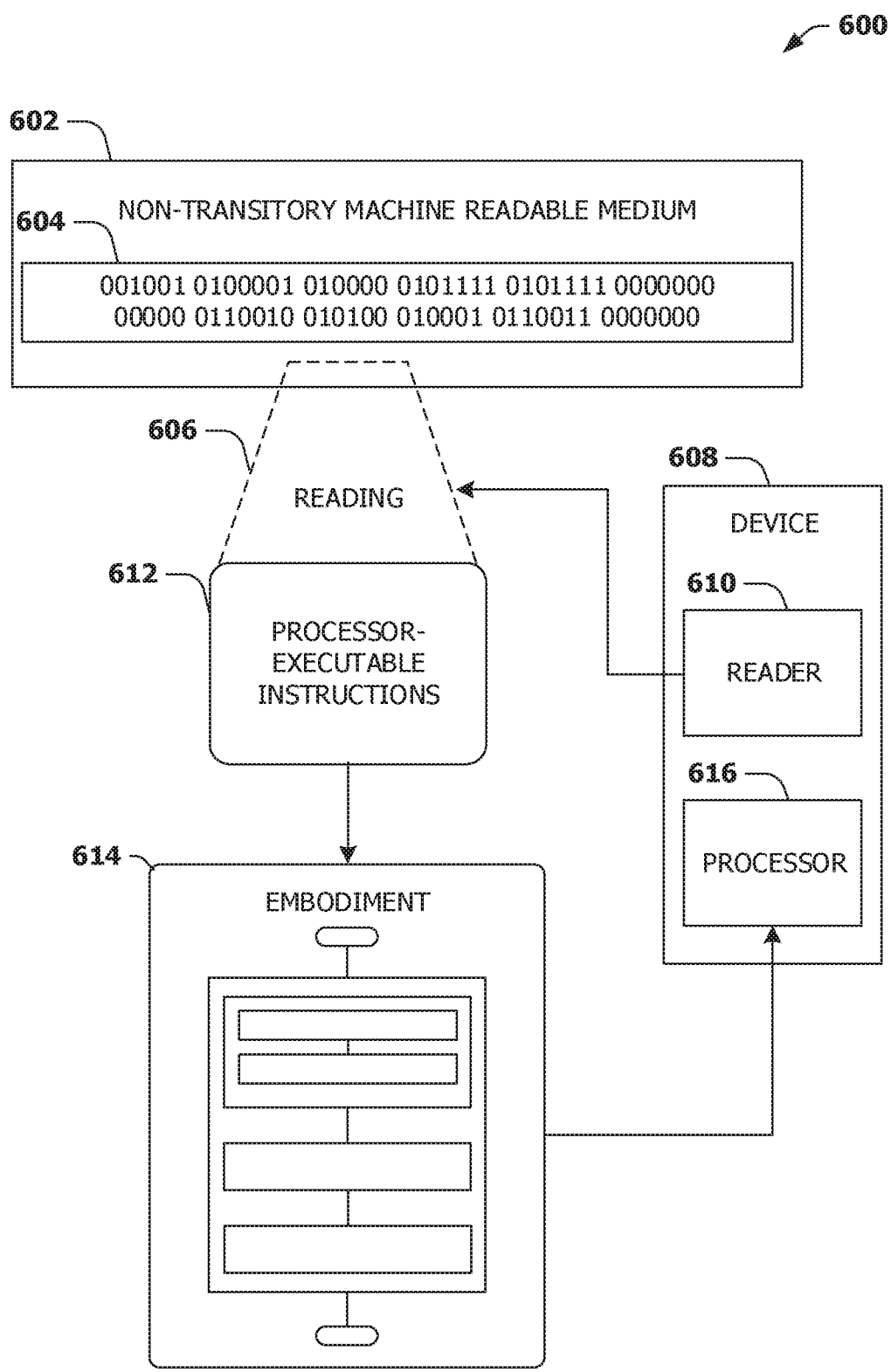
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 606 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5K, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    identifying a first plurality of sets of device information associated with a plurality of devices, wherein a set of device information of the first plurality of sets of device information comprises:
        identification information associated with a device of the plurality of devices; and
        user information associated with the device of the plurality of devices;
    grouping, based upon the first plurality of sets of device information, the plurality of devices into a plurality of groups, wherein a group of the plurality of groups corresponds to a set of devices of the plurality of devices;
    generating, by a hardware processor, a plurality of group profiles associated with the plurality of groups, wherein:
        a first group profile of the plurality of group profiles is associated with a first group of the plurality of groups;
        the first group profile comprises group information associated with a first set of devices corresponding to the first group; and
        the first group profile is generated based upon a second plurality of sets of device information, of the first plurality of sets of device information, associated with the first set of devices corresponding to the first group;
    receiving a request for content associated with a first device of the first set of devices;
    determining the first group profile, of the plurality of group profiles, based upon the request for content; and
    selecting a first content item for presentation via the first device based upon the first group profile generated based upon the second plurality of sets of device information associated with the first set of devices corresponding to the first group.

2. The method of claim 1, wherein:
    the selecting the first content item based upon the first group profile is performed based upon a determination that the first set of devices corresponding to the first group comprises the first device.

3. The method of claim 1, comprising:
    prior to the receiving the request for content, generating a first user profile associated with the first device, wherein the first user profile comprises the first group profile and first identification information associated with the first device;
    storing the first user profile in a user profile database; and
    responsive to the receiving the request for content, analyzing the user profile database based upon second identification information comprised within the request for content to identify the first user profile, wherein the selecting the first content item based upon the first group profile is performed based upon a determination that the first user profile comprises the first group profile.

4. The method of claim 1, comprising:
    prior to the receiving the request for content, generating a first user profile associated with the first device, wherein the first user profile comprises an indication of the first group profile and first identification information associated with the first device;
    storing the first user profile in a user profile database; and
    responsive to the receiving the request for content, analyzing the user profile database based upon second identification information comprised within the request for content to identify the first user profile, wherein the selecting the first content item based upon the first group profile is performed based upon a determination that the first user profile comprises the indication of the first group profile.

5. The method of claim 1, comprising:
    responsive to determining that the first content item is presented via the first device, generating a transaction identifier;
    transmitting the transaction identifier to a server associated with the first content item;
    receiving conversion information, wherein the conversion information is indicative of a conversion event associated with the presentation of the first content item via the first device; and
    determining that the conversion event is associated with the presentation of the first content item via the first device based upon a determination that the conversion information comprises the transaction identifier.

6. The method of claim 5, comprising:
    storing, in a transaction data structure, an indication of the transaction identifier, wherein the determining that the conversion event is associated with the presentation of the first content item comprises analyzing the transaction data structure based upon the conversion information to determine that the transaction identifier in the transaction data structure matches the transaction identifier in the conversion information.

7. The method of claim 5, comprising:
modifying the first group profile based upon the determining that the conversion event is associated with the presentation of the first content item.

8. The method of claim 1, comprising:
responsive to determining that the first content item is presented via the first device, generating a transaction identifier;
transmitting the transaction identifier to a server associated with the first content item;
receiving conversion information, wherein the conversion information is indicative of a conversion event associated with the first content item; and
determining that the conversion event is associated with presentation of the first content item via a device of the first set of devices corresponding to the first group based upon a determination that the conversion information comprises the transaction identifier.

9. The method of claim 8, comprising:
storing, in a transaction data structure, an indication of the transaction identifier, wherein the determining that the conversion event is associated with the presentation of the first content item comprises analyzing the transaction data structure based upon the conversion information to determine that the transaction identifier in the transaction data structure matches the transaction identifier in the conversion information.

10. The method of claim 8, comprising:
modifying the first group profile based upon the determining that the conversion event is associated with the presentation of the first content item.

11. The method of claim 1, wherein:
a first set of device information of the first plurality of sets of device information comprises first user information associated with a second device, wherein the first user information comprises activity information and demographic information.

12. The method of claim 1, wherein the generating the plurality of group profiles comprises:
performing dimensional reduction of the second plurality of sets of device information to generate the first group profile.

13. A computing device comprising:
a hardware processor; and
a memory device comprising processor-executable instructions that when executed by the hardware processor cause performance of operations, the operations comprising:
receiving a first plurality of sets of device information associated with a plurality of devices, wherein a set of device information of the first plurality of sets of device information comprises:
identification information associated with a device of the plurality of devices; and
user information associated with the device of the plurality of devices;
grouping, based upon the first plurality of sets of device information, the plurality of devices into a plurality of groups, wherein a group of the plurality of groups corresponds to a set of devices of the plurality of devices;
generating a plurality of group profiles associated with the plurality of groups, wherein:
a first group profile of the plurality of group profiles is associated with a first group of the plurality of groups;
the first group profile comprises group information associated with a first set of devices corresponding to the first group; and the first group profile is generated based upon a second plurality of sets of device information, of the first plurality of sets of device information, associated with the first set of devices corresponding to the first group;
receiving a request for content associated with a first device of the first set of devices;
determining the first group profile, of the plurality of group profiles, based upon the request for content; and
selecting a first content item for presentation via the first device based upon the first group profile generated based upon the second plurality of sets of device information associated with the first set of devices corresponding to the first group.

14. The computing device of claim 13, wherein:
the selecting the first content item based upon the first group profile is performed based upon a determination that the first set of devices corresponding to the first group comprises the first device.

15. The computing device of claim 13, the operations comprising:
responsive to determining that the first content item is presented via the first device, generating a transaction identifier;
transmitting the transaction identifier to a server associated with the first content item;
receiving conversion information, wherein the conversion information is indicative of a conversion event associated with the presentation of the first content item via the first device; and
determining that the conversion event is associated with the presentation of the first content item via the first device based upon a determination that the conversion information comprises the transaction identifier.

16. The computing device of claim 15, the operations comprising:
storing, in a transaction data structure, an indication of the transaction identifier, wherein the determining that the conversion event is associated with the presentation of the first content item comprises analyzing the transaction data structure based upon the conversion information to determine that the transaction identifier in the transaction data structure matches the transaction identifier in the conversion information.

17. The computing device of claim 15, the operations comprising:
modifying the first group profile based upon the determining that the conversion event is associated with the presentation of the first content item.

18. A non-transitory machine readable medium having stored thereon processor-executable instructions that when executed cause performance of operations, the operations comprising:
identifying a first plurality of sets of device information associated with a plurality of devices, wherein a set of device information of the first plurality of sets of device information comprises:
identification information associated with a device of the plurality of devices; and
user information associated with the device of the plurality of devices;
grouping, based upon the first plurality of sets of device information, the plurality of devices into a plurality of groups, wherein a group of the plurality of groups corresponds to a set of devices of the plurality of devices;

generating a plurality of group profiles associated with the plurality of groups, wherein:
  a first group profile of the plurality of group profiles is associated with a first group of the plurality of groups;
  the first group profile comprises group information associated with a first set of devices corresponding to the first group; and
  the first group profile is generated based upon a second plurality of sets of device information, of the first plurality of sets of device information, associated with the first set of devices corresponding to the first group;
receiving a request for content associated with a first device of the first set of devices;
determining the first group profile, of the plurality of group profiles, based upon the request for content; and
selecting a first content item for presentation via the first device based upon the first group profile generated based upon the second plurality of sets of device information associated with the first set of devices corresponding to the first group.

19. The non-transitory machine readable medium of claim 18, wherein:
  the selecting the first content item based upon the first group profile is performed based upon a determination that the first set of devices corresponding to the first group comprises the first device.

20. The non-transitory machine readable medium of claim 18, the operations comprising:
  generating a transaction identifier associated with presentation of the first content item via the first device;
  transmitting the transaction identifier to a server associated with the first content item;
  receiving conversion information, wherein the conversion information is indicative of a conversion event associated with the presentation of the first content item via the first device; and
  determining that the conversion event is associated with the presentation of the first content item via the first device based upon a determination that the conversion information comprises the transaction identifier.

* * * * *